(12) United States Patent
Liu

(10) Patent No.: US 12,469,880 B2
(45) Date of Patent: Nov. 11, 2025

(54) ELECTROLYTE ADDITIVES FOR LITHIUM-SULFUR RECHARGEABLE BATTERY

(71) Applicant: THE REGENTS OF THE UNIVERSITY OF CALIFORNIA, Oakland, CA (US)

(72) Inventor: Gao Liu, Piedmont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 535 days.

(21) Appl. No.: 17/734,585

(22) Filed: May 2, 2022

(65) Prior Publication Data

US 2022/0336857 A1   Oct. 20, 2022

Related U.S. Application Data

(63) Continuation of application No. PCT/US2020/058064, filed on Oct. 29, 2020.

(60) Provisional application No. 62/929,678, filed on Nov. 1, 2019.

(51) Int. Cl.
*H01M 10/0567* (2010.01)
*C07C 43/12* (2006.01)
*H01M 10/0569* (2010.01)
*H01M 10/0525* (2010.01)

(52) U.S. Cl.
CPC ....... *H01M 10/0567* (2013.01); *C07C 43/126* (2013.01); *H01M 10/0569* (2013.01); *H01M 10/0525* (2013.01); *H01M 2300/0034* (2013.01)

(58) Field of Classification Search
None
See application file for complete search history.

(56) References Cited

U.S. PATENT DOCUMENTS 9,985,291 B2    5/2018  Son
2017/0207459 A1*  7/2017  Okada ................... H01G 11/60

FOREIGN PATENT DOCUMENTS

WO    2021087175 A1    5/2021

OTHER PUBLICATIONS

Balaish, Moran et al., "A critical review on lithium-air battery electrolytes", Phys. Chem. Phys. 2014, vol. 16, pp. 2801-2822, Jan. 2014.

(Continued)

*Primary Examiner* — Wyatt P Mcconnell
(74) *Attorney, Agent, or Firm* — O'BANION & RITCHEY LLP; John P. O'Banion

(57) ABSTRACT

The present invention provides for an amphiphilic molecule having a profluorinated alkyl-methyloligoethyleneoxide structure. The present invention also provides for an electrolyte composition comprising an amphiphilic molecule of the present invention, an electrolyte solvent, and a lithium salt.

27 Claims, 23 Drawing Sheets

Methoxyperfluorobutane

Bis(2,2,2-trifluoroethyl) ether 1,1,2,2-tetrafluoroethyl-2',2',2'-trifluoroethyl ether Perfluorotributylamine

HFE

(56) References Cited

OTHER PUBLICATIONS

Seh, Zhi Wei et al., "Designing high-energy lithium sulfur batteries", Chem Soc. Rev. 2016, vol. 45., pp. 5605-5634, published online Jul. 27, 2016.

PubChem-CID-11215049, Compound Summary "Methyltrifluoromethylsulfone", Oct. 26, 2006, pp. 1-15.

ISA/US, United States Patent and Trademark Office (USPTO), International Search Report and Written Opinion issued Mar. 30, 2021, related PCT international application No. PCT/US2020/058064, pp. 1-13, with claims searched, 14-19.

Fiala, Tomas et al., "Thermodynamics of Halide Binding to a Neutral Bambusuril in Water and Organic Solvents", J. Org. Chem. 2018, 83, 4, Jan. 26, 2018, pp. 1903-1912. https://doi.org/10.1021/acs.joc.7b02846.

\* cited by examiner

Methoxyperfluorobutane

Bis(2,2,2-trifluoroethyl) ether 1,1,2,2-tetrafluoroethyl-2',2',2'-trifluoroethyl ether Perfluorotributylamine

HFE

Note: No additives in the electrolyte

DOL/DME

ELECTROLYTE ADDITIVES FOR LITHIUM-SULFUR RECHARGEABLE BATTERY

CROSS REFERENCE TO RELATED APPLICATIONS

This application claims priority as a continuation application to PCT International Patent Application No. PCT/US2020/058064, filed Oct. 29, 2020, which claims priority to U.S. Provisional Patent Application Ser. No. 62/929,678, filed Nov. 1, 2019, both of which are hereby incorporated by reference.

STATEMENT OF GOVERNMENTAL SUPPORT

The invention was made with government support under Contract No. DE-AC02-05CH11231 awarded by the U.S. Department of Energy. The government has certain rights in the invention.

FIELD OF THE INVENTION

This invention relates generally to lithium rechargeable batteries, and more specifically to additives and electrolyte system for lithium-sulfur rechargeable battery.

BACKGROUND OF THE INVENTION

Lithium ion batteries (LIBs) have been developed into an important technology for energy storage applications, while the demand for materials with high energy density is urgent. A strong demand for low-cost and high-energy-density rechargeable batteries has spurred lithium-sulfur (Li—S) rechargeable battery research. First, sulfur is an abundant and low-cost material. Second, the Gibbs energy of the lithium (Li) and sulfur reaction is approximately 2,600 Wh/kg, assuming the complete reaction of Li with sulfur to form Li2S, more than five times the theoretical energy of transition metal oxide cathode materials and graphite coupling. With these advantages, Li—S batteries could be both high energy density and low cost, satisfying demand in energy storage for transportation application. The major obstacle is the loss of sulfur cathode material as a result of polysulfide dissolution into common electrolytes, which causes a shuttle effect and significant capacity fade. The polysulfide shuttle effect leads to poor sulfur utilization and fast-capacity fade, which have hindered widespread use of rechargeable Li—S batteries. Better electrolytes and additives for Li—S battery are needed for reduction of polysulfide dissolution. The ideal electrolyte for sulfur electrode should have moderate ion conductivity, have more stability towards polysulfide, and promotes the polysulfide affiliation with the electrode substrate to prevent polysulfide dissolution.

SUMMARY OF INVENTION

The present invention provides for an amphiphilic molecule having the following structure:

(Chemical Structure I)

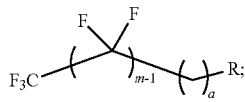

wherein R is

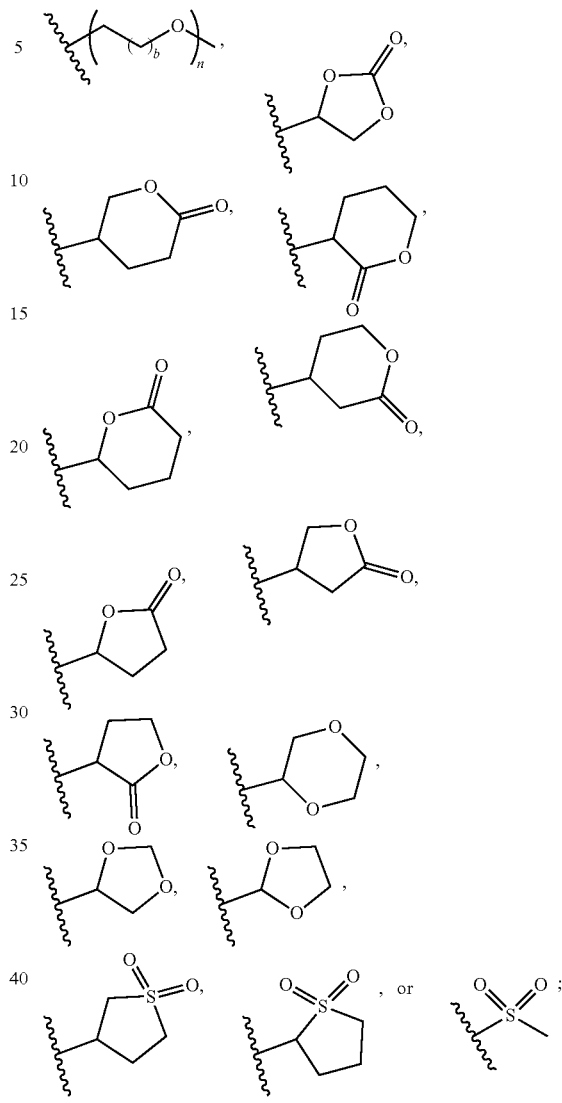

m is an integer from 1 to 21; a is an integer from 0 to 20; b is an integer from 0 to 4; and n is an integer from 1 to 20. In some embodiments, m is 1, 2, 3, 4, 5, 6, 7, 8, 9, 10, 11, 12, 13, 14, 15, 16, 17, 18, 19, 20, or 21. In some embodiments, a is 1, 2, 3, 4, 5, 6, 7, 8, 9, 10, 11, 12, 13, 14, 15, 16, 17, 18, 19, or 20. In some embodiments, b is 0, 1, 2, 3, or 4. In some embodiments, n is 1, 2, 3, 4, 5, 6, 7, 8, 9, 10, 11, 12, 13, 14, 15, 16, 17, 18, 19, or 20.

In some embodiments, the amphiphilic molecule has the following structure:

(Chemical Structure II)

wherein m is an integer from 1 to 21, a is an integer from 0 to 20, b is an integer from 0 to 4, and n is an integer from 1 to 20.

In some embodiments, R is

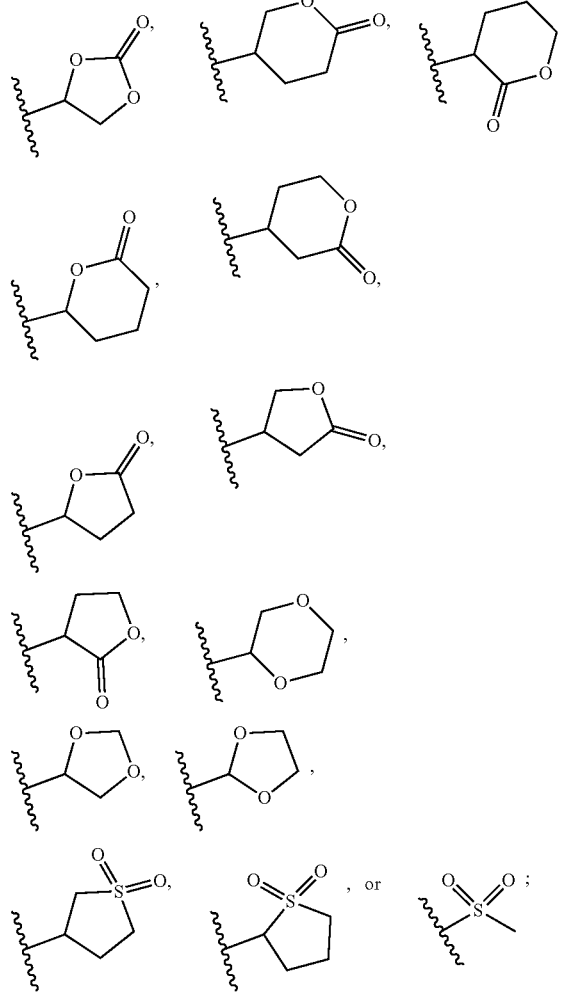

wherein m is an integer from 1 to 21; a is an integer from 0 to 20.

In some embodiments, the amphiphilic molecule has the following structure:

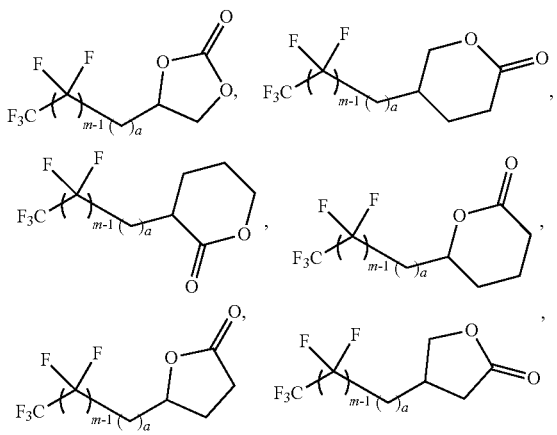

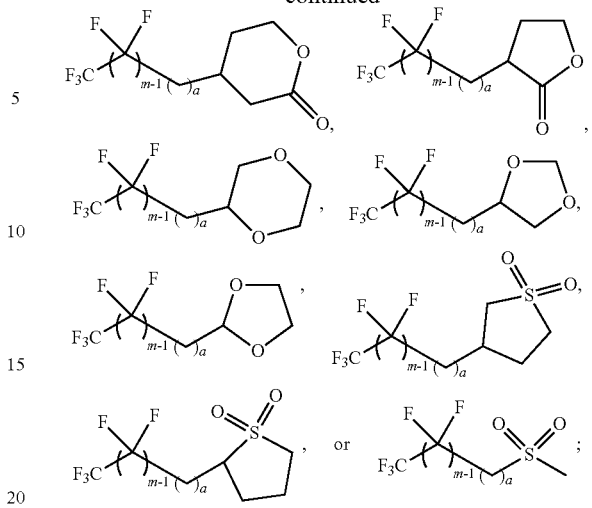

wherein m is an integer from 1 to 21; a is an integer from 0 to 20.

In a particular embodiment, the amphiphilic molecule has Chemical Structure II and is $F_3EO_1$, wherein m is 3, a is 0, b is 1 and n is 1. In a particular embodiment, the amphiphilic molecule has Chemical Structure II and is $F_8EO_4$, wherein m is 8, a is 0, b is 1 and n is 4.

In some embodiments, the amphiphilic molecule is capable of self-formation of a micelle. In some embodiments, the micelle is an inverse micelle, prolate micelle, inverse prolate micelle, normal hexagonal phase, inverse hexagonal phase inverse, oblate micelle bilayered fragment, or the like. One skilled in the art can readily identify the polar and non-polar ends (or parts) of each amphiphilic molecule. The fluorinated alkyl is the polar end (or part), while the polyether and R group form the non-polar end (or part).

The present invention provides for an electrolyte composition comprising an amphiphilic molecule of the present invention, an electrolyte solvent, and a lithium salt.

In some embodiments, the electrolyte solvent is a highly fluorinated alkane, alkyl ether or alkyl tertiary amine comprising more F atoms than H atoms. In some embodiments, the alkane has a main chain having 2, 3, 4, 5, 6, 7, 8, 9, 10, 11, 12, 13, 14, 15, 16, 17, 18, 19, or 20 carbon atoms. In some embodiments, the alkane has a straight or branched chain. In some embodiments, the alkane has a total of 3, 4, 5, 6, 7, 8, 9, 10, 11, 12, 13, 14, 15, 16, 17, 18, 19, or 20 carbon atoms. In some embodiments, the electrolyte solvent has the following chemical structure: $R_1$—O—$R_2$, or

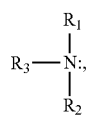

wherein $R_1$ is —$CH_3$, —$C_2H_5$, or —$R_4$; and $R_2$, $R_3$, and $R_4$ are each independently -α-$C_yH_zF_{2y+1-z}$, wherein α is —CHF—, —$CF_2$—, or —$CH_2$—; y is 1, 2, 3, 4, 5, 6, 7, 8, 9, or 10; and z is 0 or 1. In some embodiments, —$C_yF_{y+2}$ is a straight chain alkyl. In some embodiments, —$C_yF_{2y+1}$ is a branched alkyl, and y is equal to or more than 3. In some embodiments, $R_1$ and $R_2$ are identical. In some embodiments, $R_2$ and $R_3$ are identical. In some embodiments, $R_1$, $R_2$, and $R_3$ are identical.

In some embodiments, the electrolyte solvent is methoxyperfluorobutane, profluorinated alkane, bis(2,2,2-trifluoroethyl)ether, 1,1,2,2-tetrafluoroethyl-2',2',2'-trifluoroethyl ether, perfluorotributylamine, hydrofluoroether (HFE), or a mixture thereof. In some embodiments, the profluorinated alkane is C(H or F)$_3$[C(H or F)$_2$]$_x$C(H or F)$_3$, wherein x is an integer from 0 to 20, and there are more F atoms than H atoms. In some embodiments, the profluorinated alkane is CF$_3$(CF$_2$)$_x$CF$_3$, wherein x is an integer from 0 to 20. In some embodiments, x is 1, 2, 3, 4, 5, 6, 7, 8, 9, 10, 11, 12, 13, 14, 15, 16, 17, 18, 19, or 20. In some embodiments, the hydrofluoroether (HFE) is CHF$_2$CF$_2$—O—CH$_2$CF$_2$CHF$_2$, C$_7$F$_{15}$—O—C$_2$H$_5$, C$_4$F$_9$—O—C$_2$H$_5$, n-C$_3$F$_7$—O—CH$_3$), CF$_3$CF$_2$—O—CH$_3$, CF$_3$CHFCF$_2$—O—CH$_3$, CF$_3$—O—CH$_3$, CHF$_2$—O—CHF$_2$, CF$_3$CF$_2$—O—CH$_3$), or CF$_3$—O—CHFCF$_3$. In some embodiments, the HFE is CHF$_2$CF$_2$—O—CH$_2$CF$_2$CHF$_2$. Chemical structure of different electrolyte solvents is shown in FIG. 1.

In some embodiments, the lithium salt is lithium bis(trifluoromethanesulfonyl)imide (LiTFSI), lithium bis(oxalato)borate (LiBOB), lithium bis(pentafluoroethanesulfonyl)imide (LiBETI), LiClO$_4$, lithium bis(fluorosulfonyl)imide (LiFSI), LiPF$_6$, LiAsF$_6$, or a mixture thereof. In some embodiments, the lithium salt has an ionic association strength that is equal to or less than about the ionic association strength of LiBETI, and is equal to or more than about the ionic association strength of LiTFSI.

In some embodiments, the electrolyte composition comprises one or more amphiphilic molecule of the present invention, or a mixture thereof; methoxyperfluorobutane, profluorinated alkane, bis(2,2,2-trifluoroethyl)ether, 1,1,2,2-tetrafluoroethyl-2',2',2'-trifluoroethyl ether, perfluorotributylamine, or a mixture thereof; and, LiTFSI, LiBOB, LiBETI, LiClO$_4$, LiFSI, LiPF$_6$, LiAsF$_6$, or a mixture thereof.

In some embodiments, the electrolyte composition comprises F$_3$EO$_1$:HFE=1:5 (v/v) and 0.5 M LiTFSI, wherein HFE is CHF$_2$CF$_2$—O—CH$_2$CF$_2$CHF$_2$. F$_3$EO$_1$ has the following chemical structure:

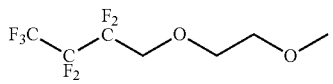

In some embodiments, the electrolyte composition comprises F$_8$EO$_4$:HFE=2:3 (v/v) and 0.5 M LiTFSI, wherein HFE is CHF$_2$CF$_2$—O—CH$_2$CF$_2$CHF$_2$. FIG. 2 shows the synthesis of F$_8$EO$_4$. FIG. 3 shows the NMR for F$_8$EO$_4$. F$_8$EO$_4$ has the following chemical structure:

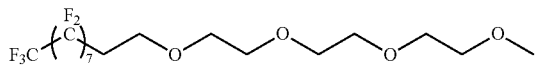

The shorthand labeling of biphiphilic additives F$_n$EO$_m$ is: "F" stands for the unit of —CF$_2$— and ending CF$_3$— moieties, and "n" is the number of the moieties; "EO" stands for the —CH$_2$CH$_2$O— ethyleneoxide moiety, the —CH$_2$ end is covalently bond with CF$_2$—, and the O— end is covalently bond with a methyl moiety, "m" is the number of the —CH$_2$CH$_2$O— repeating units. The "F" segment is profluorinated alkyl, and the "EO" segment is methyloligoethyleneoxide, wherein the two segments are linked by a covalent bond.

The present invention also provides for a lithium ion battery comprising the electrolyte composition of the invention.

The amphiphilic molecule and electrolyte composition of the present invention have more stability towards polysulfide, and promote polysulfide affiliation with the electrode substrate to prevent polysulfide dissolution.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
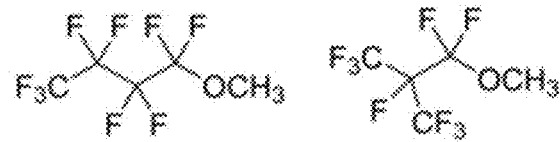
FIG. 1 shows chemical structures of suitable electrolyte solvent.
Figure 1:
Figure 1:
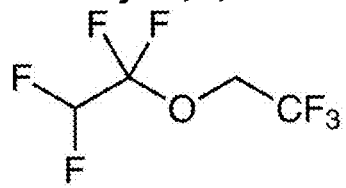
Figure 1:
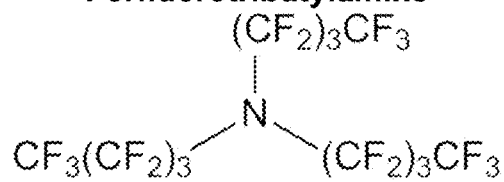
Figure 1:
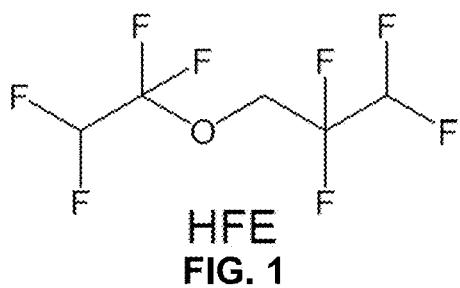
Figure 2:
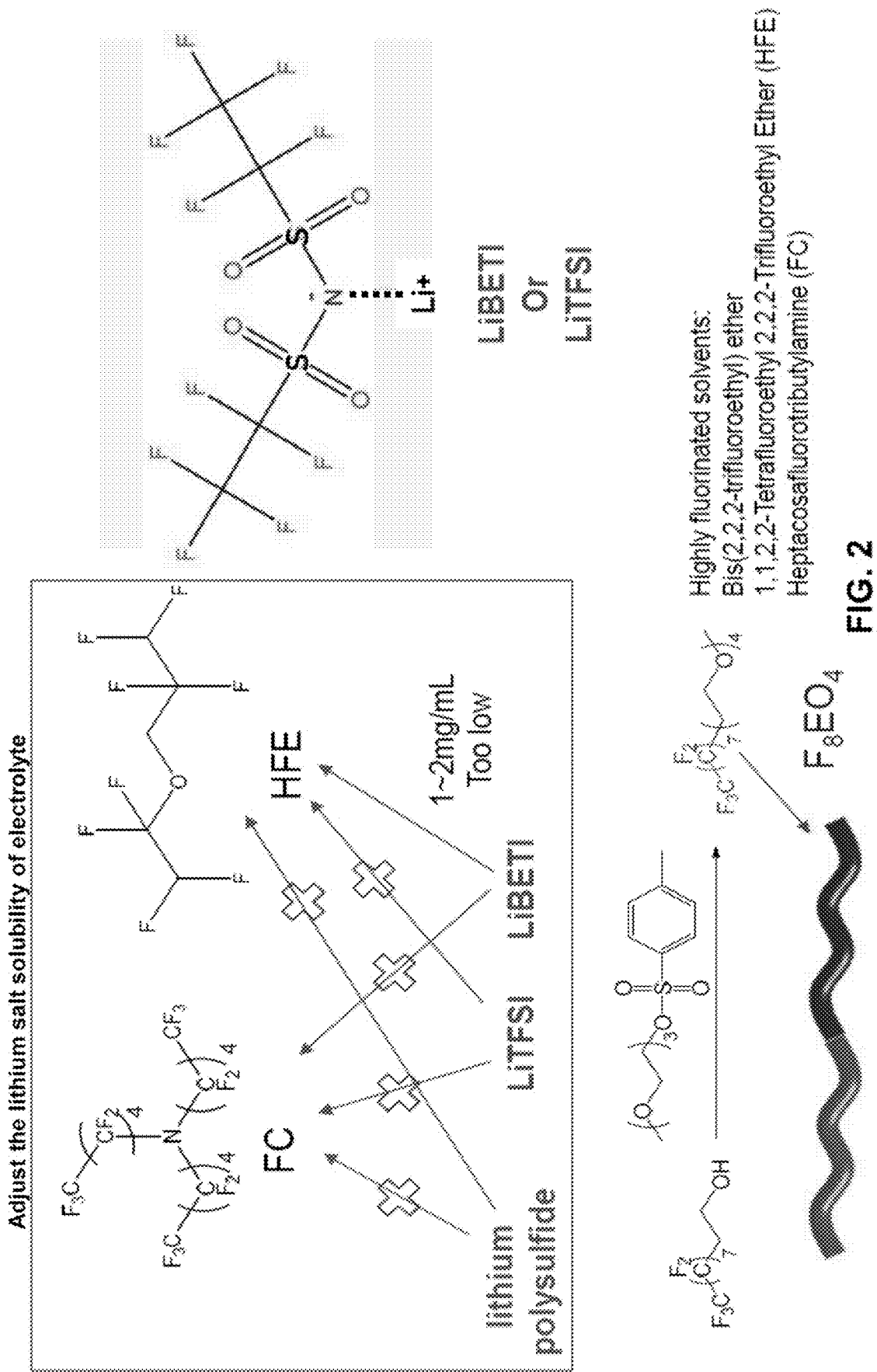
FIG. 2 shows the inhibition of the shuttle of lithium polysulfide, and the synthesis of F$_8$EO$_4$.
Figure 3:
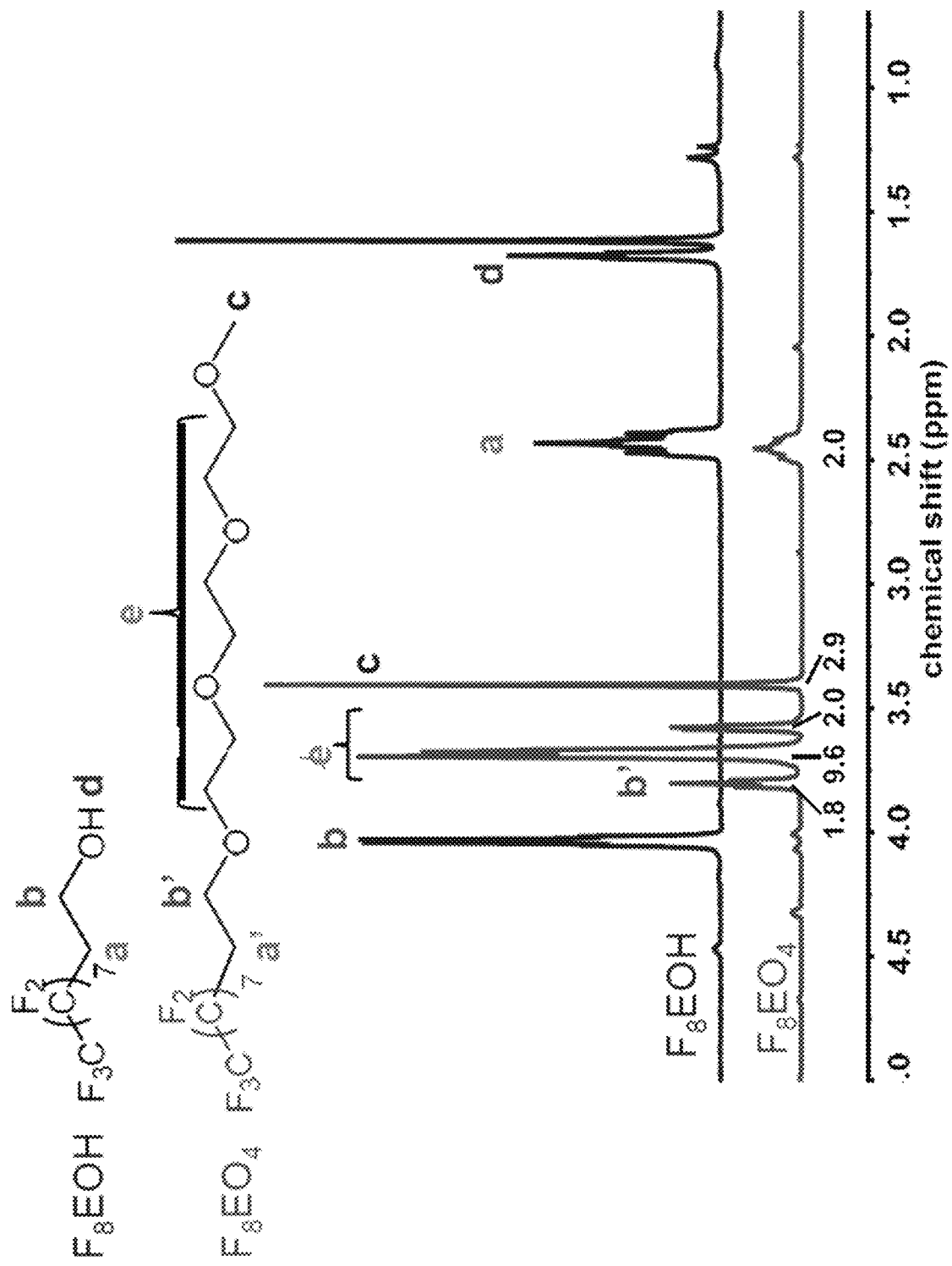
FIG. 3 shows the proton NMR of the major starting material and product.

Before the invention is described in detail, it is to be understood that, unless otherwise indicated, this invention is not limited to particular sequences, expression vectors, enzymes, host microorganisms, or processes, as such may vary. It is also to be understood that the terminology used herein is for purposes of describing particular embodiments only and is not intended to be limiting.

In this specification and in the claims that follow, reference will be made to a number of terms that shall be defined to have the following meanings:

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

As used in the specification and the appended claims, the singular forms "a," "an," and "the" include plural referents unless the context clearly dictates otherwise. Thus, for example, reference to "molecules" includes a plurality of a molecule species as well as a plurality of molecules of different species.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The term "about" refers to a value including 10% more than the stated value and 10% less than the stated value.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

The amphiphilic molecule and electrolyte composition of the present invention can be used for rechargeable Li—S battery, and can promote lithium salt (such as, LITFSI) dissolution into electrolyte, but preventing polysulfide dissolution during cell operation. In a particular embodiment, the new electrolyte comprises of a highly fluorinated solvent (such as, 1,1,2,2-Tetrafluoroethyl 2,2,2-Trifluoroethyl Ether), a lithium salt (such as, LiTFSI), and a "biphiphilic" additive $F_8EO_4$.

The additive molecules can form micelles in the highly fluorinated solvent. The micelle core is methyloligoethyleneoxide, and the profluorinated alkyls extend to the highly fluorinated solvent. The highly fluorinated solvent does not dissolve polysulfide. The combination solvent can effectively dissolvent LiTFSI to 0.5M concentration in the micelle core for any of the amphiphilic molecule, including but not limited to $F_8EO_4$ and $F_3EO_1$. The main solvent body is any highly fluorinated solvent, which prevents polysulfide dissolution.

All the current electrolytes and additives for electrolyte are distributed homogenously. This invention uses a bi-functional additive to form micelle structures within the electrolyte. The micelle core selectively dissolves lithium salt, and the bulk of electrolyte solvent of highly fluorinated solvent prevents polysulfide dissolution.

Amphiphilic molecules of the present invention can be synthesized using the following method (with this particular example provided for the synthesis of $F_8EO_4$):

Reaction 1:

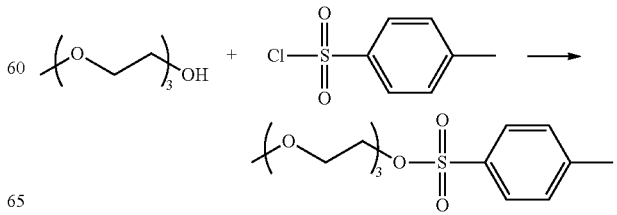

Reaction 2:

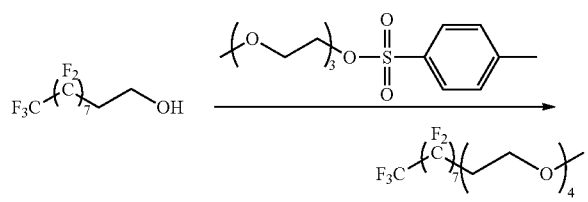

Figure 13:
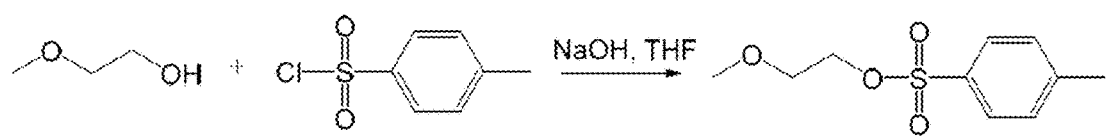
FIG. 13 shows the synthesis of the F$_n$EO$_m$ amphiphilic additives.
Figure 13:
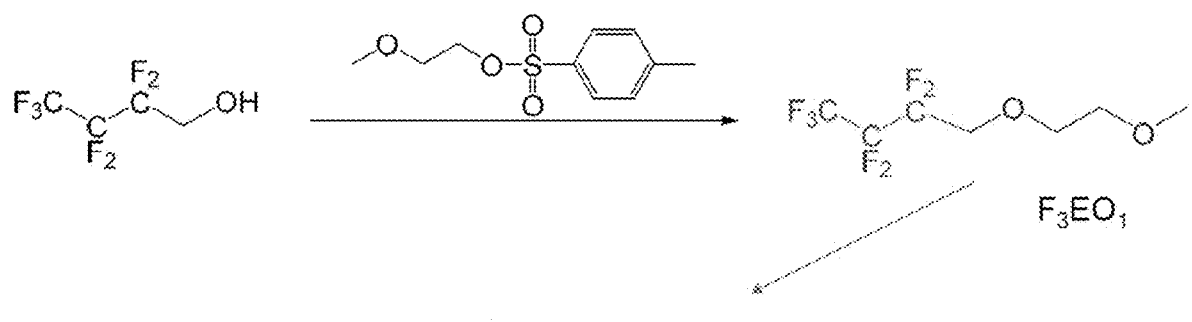

FIG. 13 shows the synthesis of $F_3EO_1$. One skilled in the art can readily be able to synthesize any $F_nEO_m$ by selecting different reactants for Reactions 1 and 2 in order to synthesize the desired $F_nEO_m$.

The $EO_3$-Tosylate (shown in Reaction 1 above) is synthesized according to J. Org. Chem. 2018, 83, 1903-1912. The synthetic procedure of FEO is stated as follows: 5.088 g EO3-Tosylate (16 mmol) and 3.72 g F—OH (8 mmol) are added to 4.8 mL NMP and followed by adding 4.8 mL 48 wt % KOH solution. The mixture is heated at 50° C. for 5 hours and 70° C. for another 2 h. After cooling down, 50 mL of ether is added and extracted against water to remove the impurities. The FEO (3.5 g, yield: 76%) was finally obtained after evaporating the solvent under vacuum.

In some embodiments, the present invention can be used in a high voltage lithium ion and lithium metal battery. In some embodiments, the cathode comprises NMC622 materials ($LiNi_{0.6}Mn_{0.2}Co_{0.2}O$). In some embodiments, the anode comprises lithium metal. In some embodiments, the electrolyte comprising 0.5M LiTFSI in F4/TTE (1:5) electrolyte. In some embodiments, the battery is a coin cell. In some embodiments, the battery has an operational voltage 2.75V-4.4V.

Figure 26:
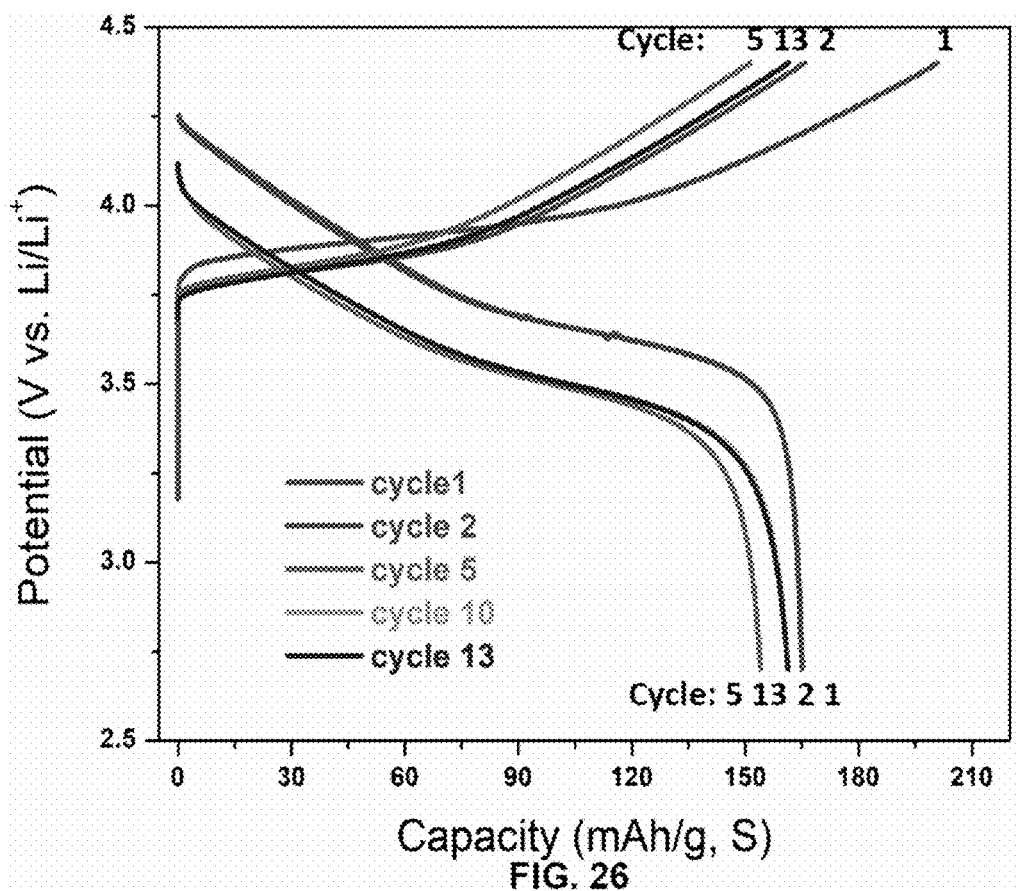
FIG. 26 shows the capacity vs. voltage for a high voltage lithium metal cell.
Figure 27:
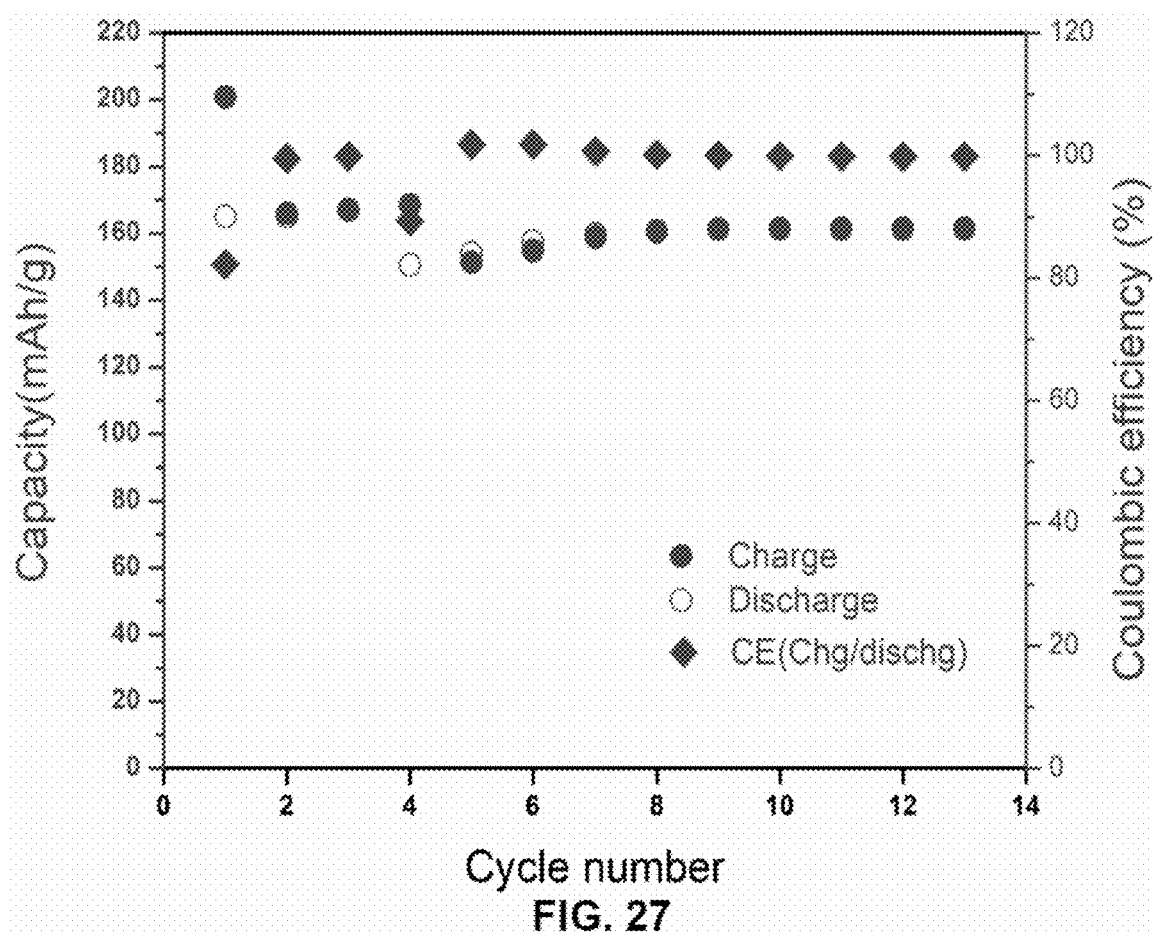
FIG. 27 shows capacity stability during high voltage lithium metal cell cycling.

A high voltage lithium ion and lithium metal battery is fabricated comprising the following: the cathode comprises NMC622 materials ($LiNi_{0.6}Mn_{0.2}Co_{0.2}O$), the anode comprises lithium metal, the electrolyte comprising 0.5M LiTFSI in F4/TTE (1:5) electrolyte. The battery is tested as follows: C/10 first 2 cycles, and C/3 cycling subsequent cycling. FIG. 26 shows the capacity vs. voltage for the high voltage lithium metal cell. FIG. 27 shows capacity stability during the high voltage lithium metal cell cycling.

The electrolytes can be used for high voltage lithium metal cells. In some embodiments, the cathode is an NMC material (such as (111, 532, 622 or 811)), NCA materials (such as $LiNi_{0.8}Co_{0.15}Al_{0.05}O_2$), or Nickelate material (such as $LiNiO_2$). In some embodiments, the cell voltage can range from 2.5 V to 6 V. In some embodiments, the anode is a Cu, Ni, or Ti, Lithium metal; a Si based material (such as Si, Si/C, SiOx), carbon base materials (such as graphite), or a mixture thereof (such as a mixture of Si based materials and carbon based materials). In some embodiments, the electrolyte is any combination of the amphiphilic electrolyte and compositions disclosed herein.

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

EXAMPLE 1

Figure 14:
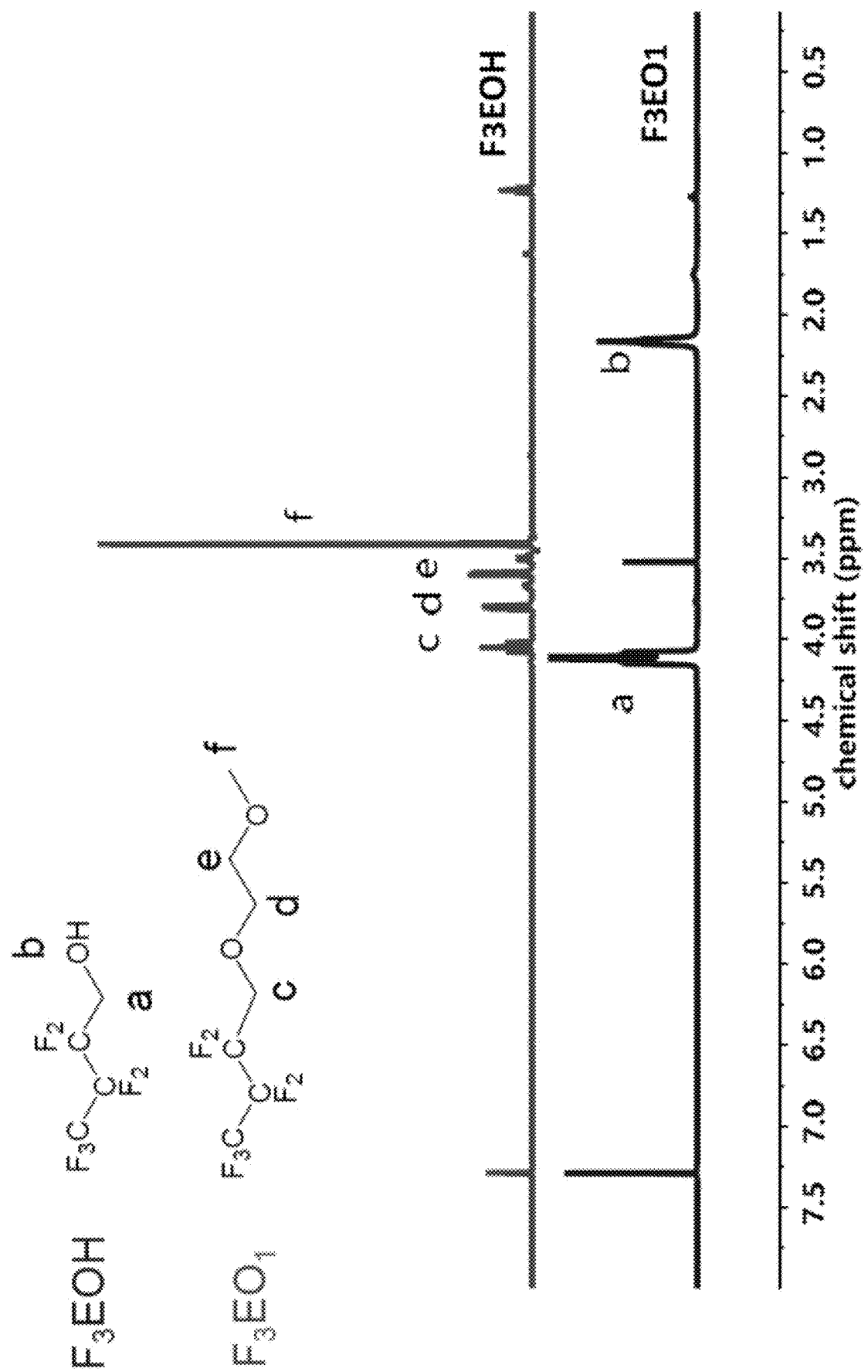
FIG. 14 shows the proton NMR of the major starting material and product.

The Li—S cell performance results obtained are reported herein. $F_8EO_4$ and $F_3EO_1$ are separately synthesized using the method taught herein. FIG. 14 shows the NMR to demonstrate the successful synthesis of $F_8EO_4$ and $F_3EO_1$. LiTFSI is tested for solubility and conductivity in different ratios of HFE and either $F_8EO_4$ or $F_3EO_1$.

TABLE 1

LiTFSI solubility and conductivity test in the amphiphilic solvents.

| Ratio Vol. | $F_8EO_4$ (mL) | HFE (mL) | LITFSI (M) | σ (mS/cm) |
|---|---|---|---|---|
| 1:1 | 0.75 | 0.75 | 0.5 | 0.61 |
| 1:1.5 | 0.5 | 0.5 | 0.5 | 0.7 |
| 1:2 | 0.6 | 0.9 | 0.5 | 0.72 |
| 1:5 | 0.1 | 0.5 | 0.5 | 0.35 |
| 1:9 | 0.1 | 0.9 | 0.3 | 0.12 |

LiTFSI does not dissolve in the 1:9 electrolyte with a concentration of 0.5 M.

TABLE 2

LiTFSI solubility and conductivity test in the amphiphilic solvents.

| Ratio Vol. | FEO (mL) | HFE (mL) | LITFSI (M) | σ (mS/cm) |
|---|---|---|---|---|
| 1:1 | 0.75 | 0.75 | 0.5 | 3.2 |
| 1:5 | 0.1 | 0.5 | 0.5 | 1.05 |

"FEO" in Table 2 is $F_3EO_1$.

Figure 4:
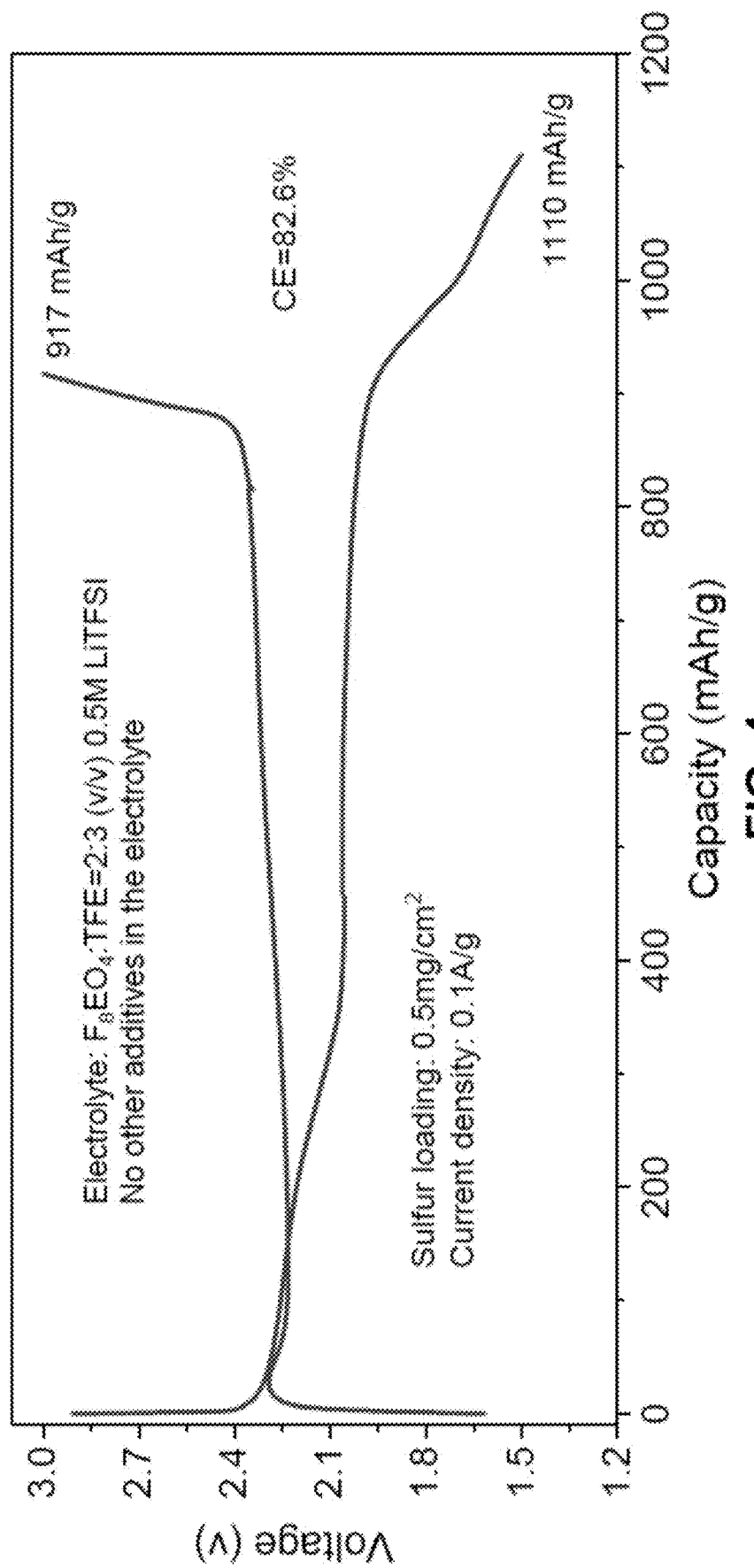
FIG. 4 shows the cell test results for F$_8$EO$_4$:HFE=2:3 (v/v) 0.5 M LiTFSI, wherein HFE is CHF$_2$CF$_2$—O—CH$_2$CF$_2$CHF$_2$.
Figure 5:
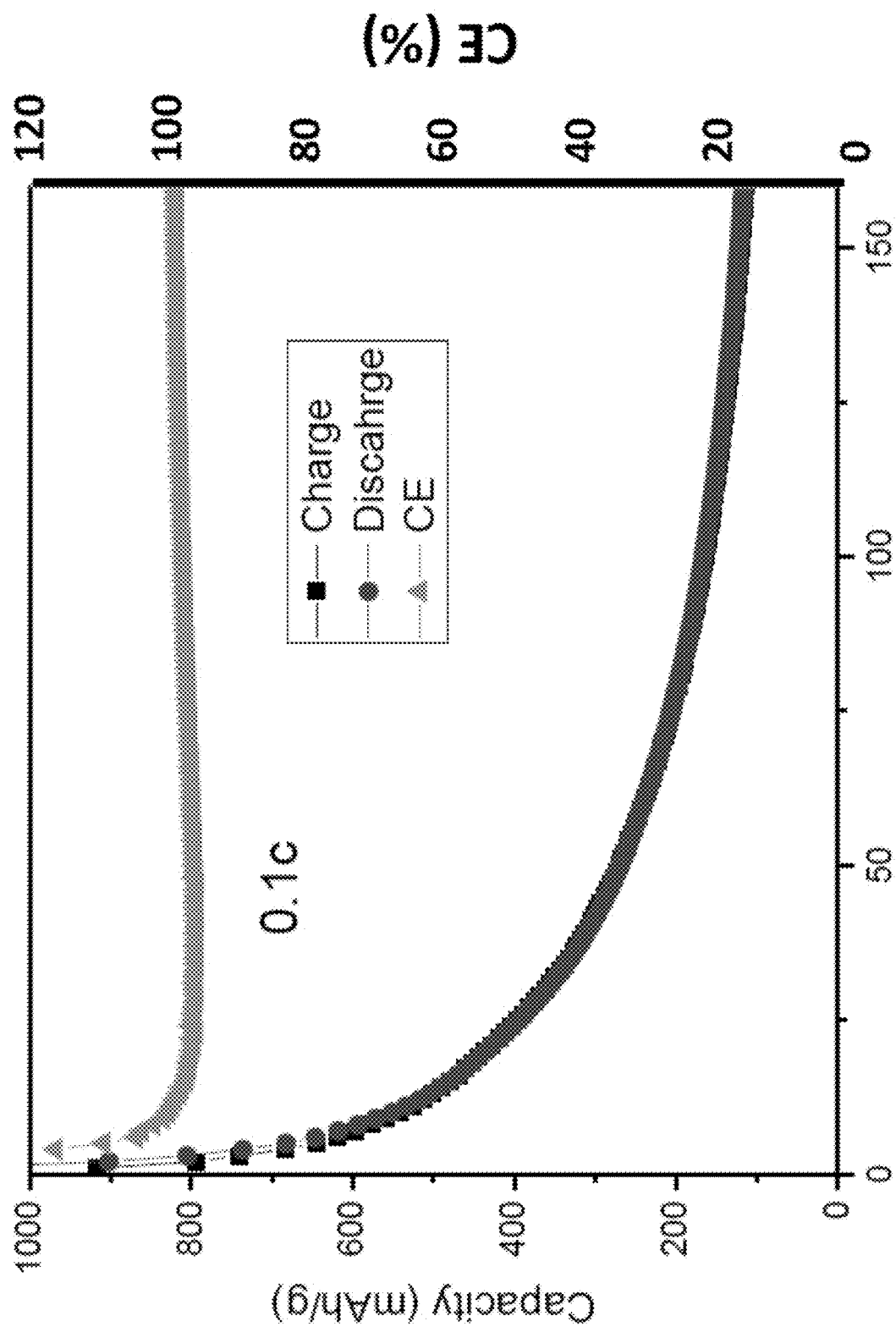
FIG. 5 shows the cell test results for F$_8$EO$_4$:HFE=2:3 (v/v) 0.5 M LiTFSI, wherein HFE is CHF$_2$CF$_2$—O—CH$_2$CF$_2$CHF$_2$.
Figure 6:
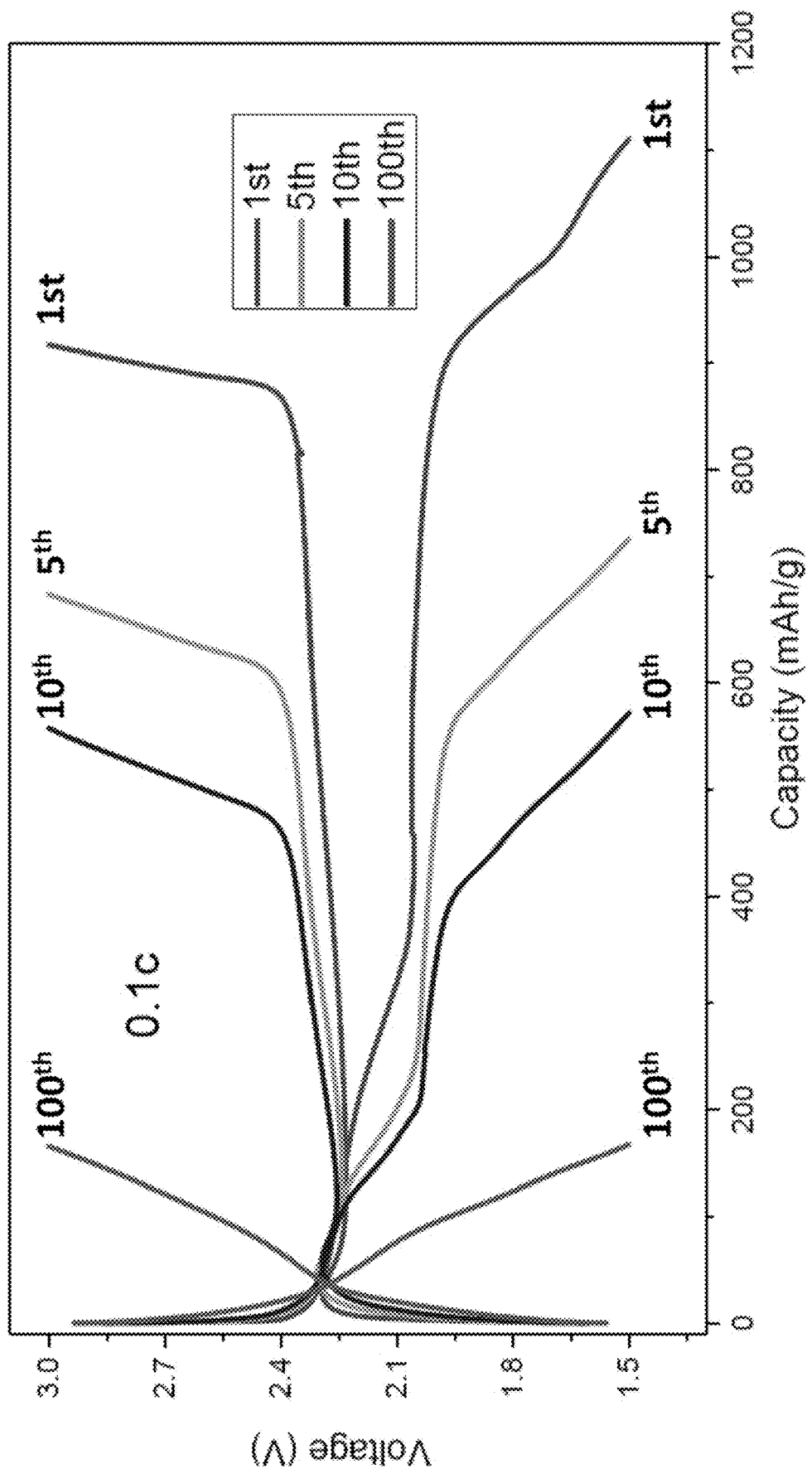
FIG. 6 shows the cell test results for F$_8$EO$_4$:HFE=2:3 (v/v) 0.5 M LiTFSI, wherein HFE is CHF$_2$CF$_2$—O—CH$_2$CF$_2$CHF$_2$.

FIGS. 4-6 shows the cell test results for $F_8EO_4$:HFE=2:3 (v/v) 0.5 M LiTFSI.

Figure 7:
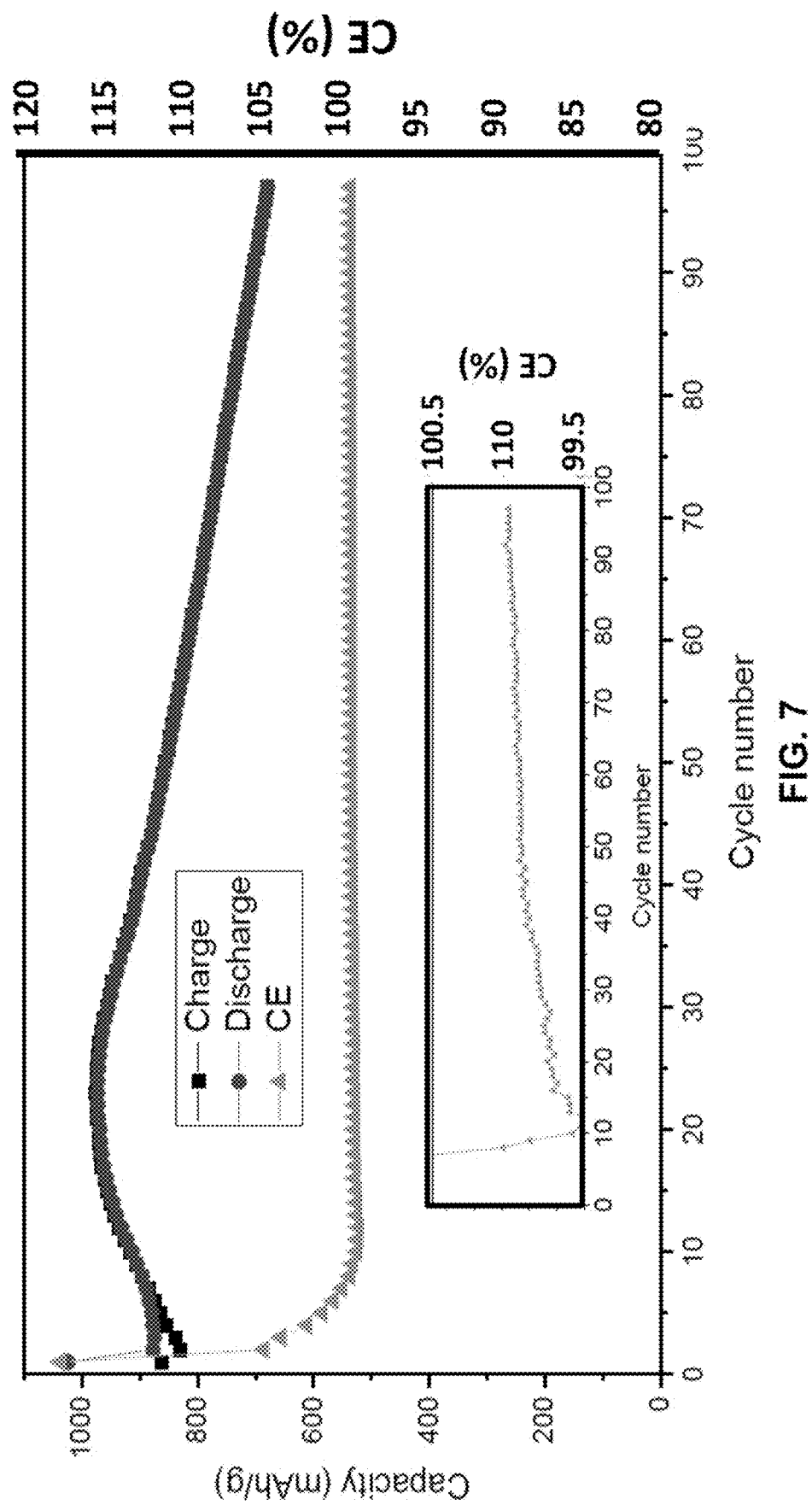
FIG. 7 shows the cell test results for F$_8$EO$_4$:HFE=1:5 (v/v) 0.5 M LiTFSI, wherein HFE is CHF$_2$CF$_2$—O—CH$_2$CF$_2$CHF$_2$.
Figure 8:
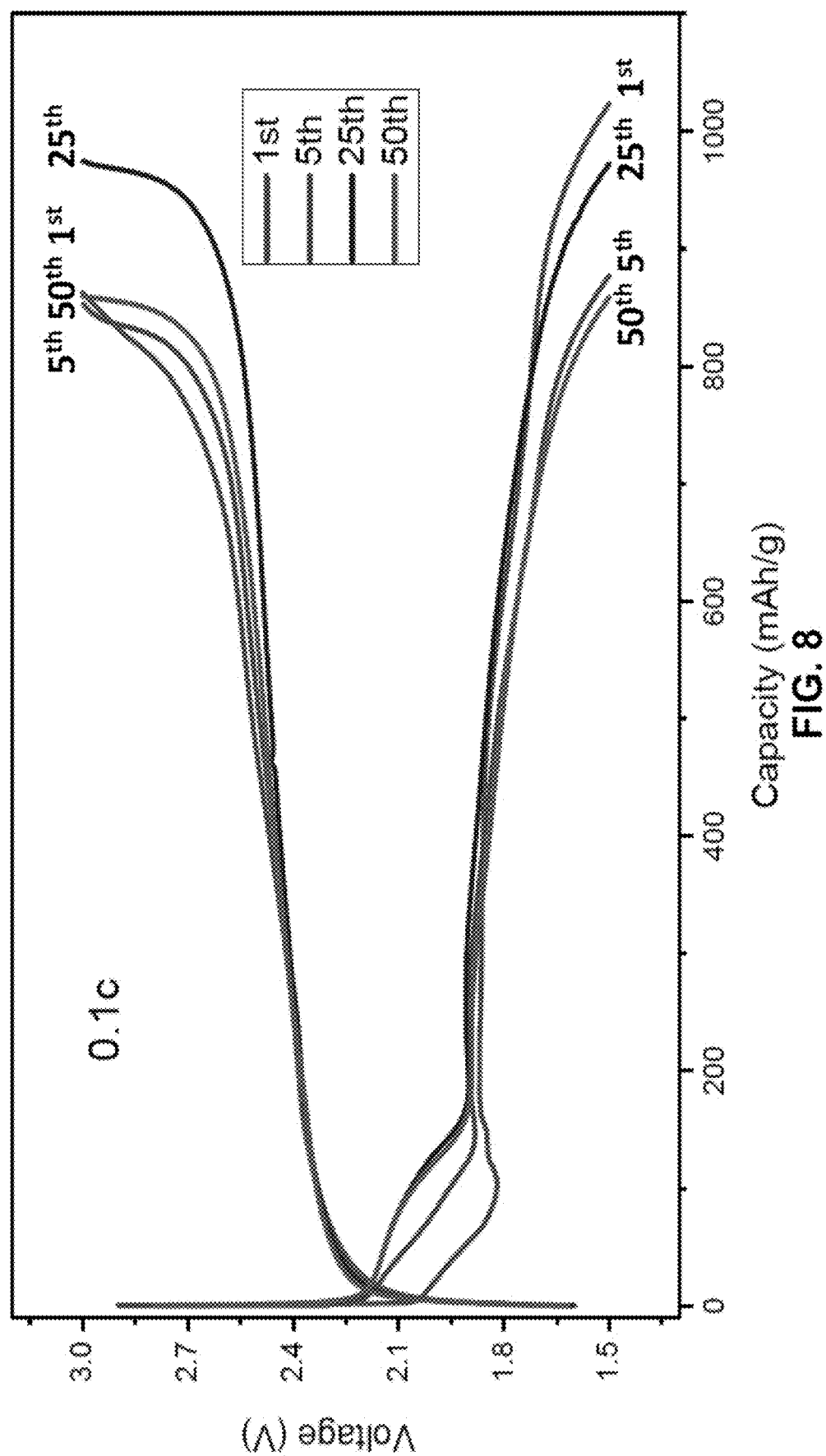
FIG. 8 shows the cell test results for F$_8$EO$_4$:HFE=1:5 (v/v) 0.5 M LiTFSI, wherein HFE is CHF$_2$CF$_2$—O—CH$_2$CF$_2$CHF$_2$.

FIGS. 7 and 8 shows the cell test results for $F_8EO_4$:HFE=1:5 (v/v) 0.5 M LiTFSI.

Figure 9:
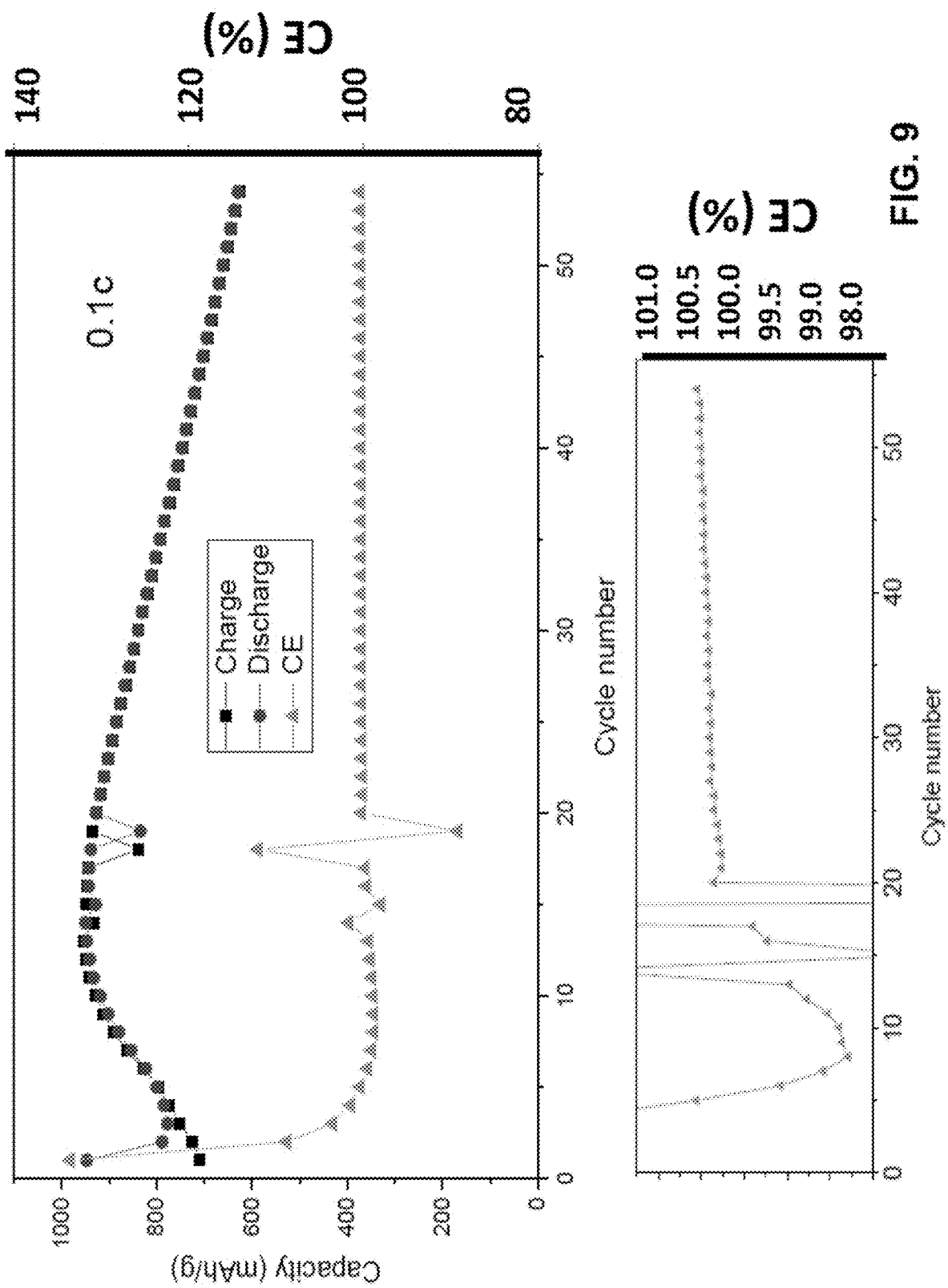
FIG. 9 shows the cell test results for F$_8$EO$_4$:HFE=9 (v/v) 0.5 M LiTFSI, wherein HFE is CHF$_2$CF$_2$—O—CH$_2$CF$_2$CHF$_2$.
Figure 10:
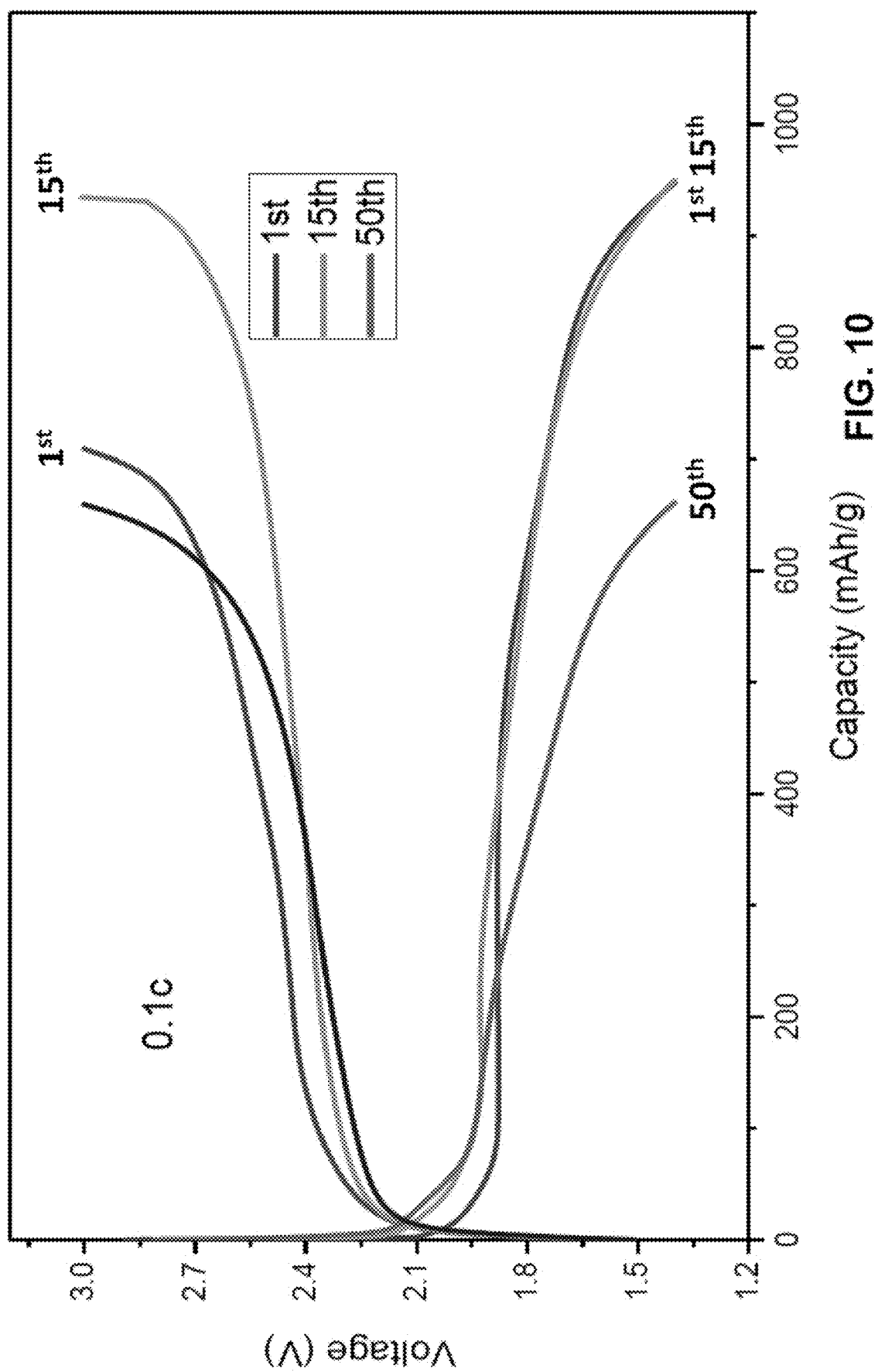
FIG. 10 shows the cell test results for F$_8$EO$_4$:HFE=9 (v/v) 0.5 M LiTFSI, wherein HFE is CHF$_2$CF$_2$—O—CH$_2$CF$_2$CHF$_2$.

FIGS. 9 and 10 shows the cell test results for $F_8EO_4$:HFE=9 (v/v) 0.5 M LiTFSI.

Figure 11:
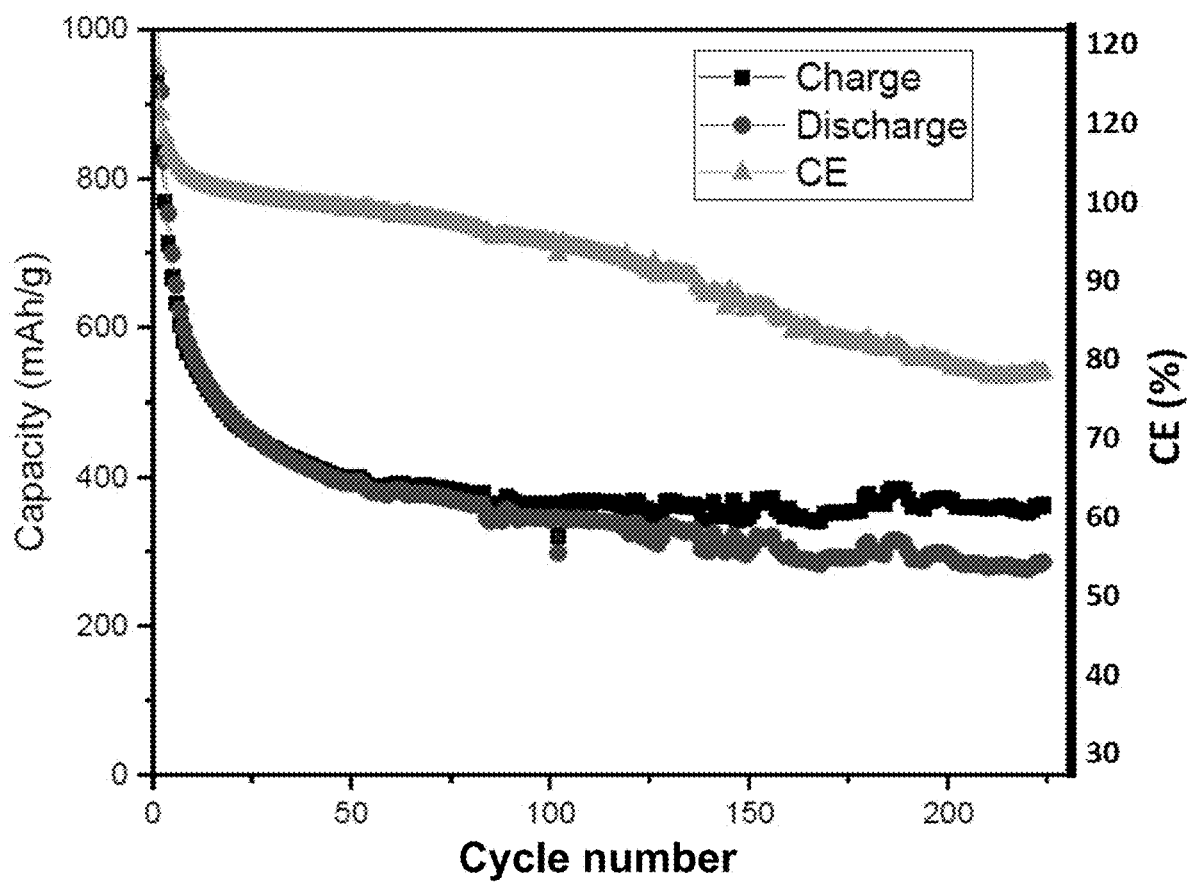
FIG. 11 shows the baseline of DOL:dimethyl ether (DME)=1:1, 1 M LiTFSI cell test results, wherein HFE is CHF$_2$CF$_2$—O—CH$_2$CF$_2$CHF$_2$.
Figure 12:
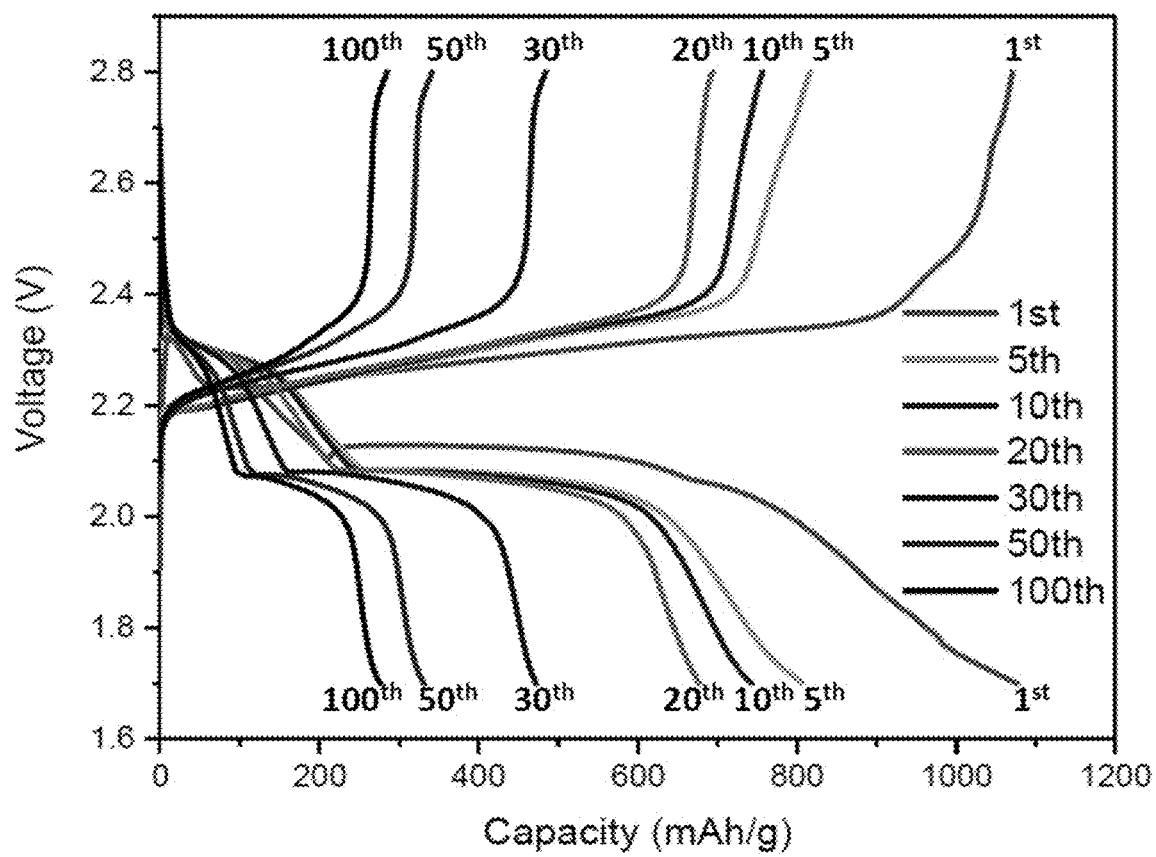
FIG. 12 shows the baseline of DOL:DME=1:1, 1 M LiTFSI cell test results, wherein HFE is CHF$_2$CF$_2$—O—CH$_2$CF$_2$CHF$_2$.

FIGS. 11 and 12 shows the cell test results for DOL:DME=1:1, 1 M LiTFSI.

Figure 15:
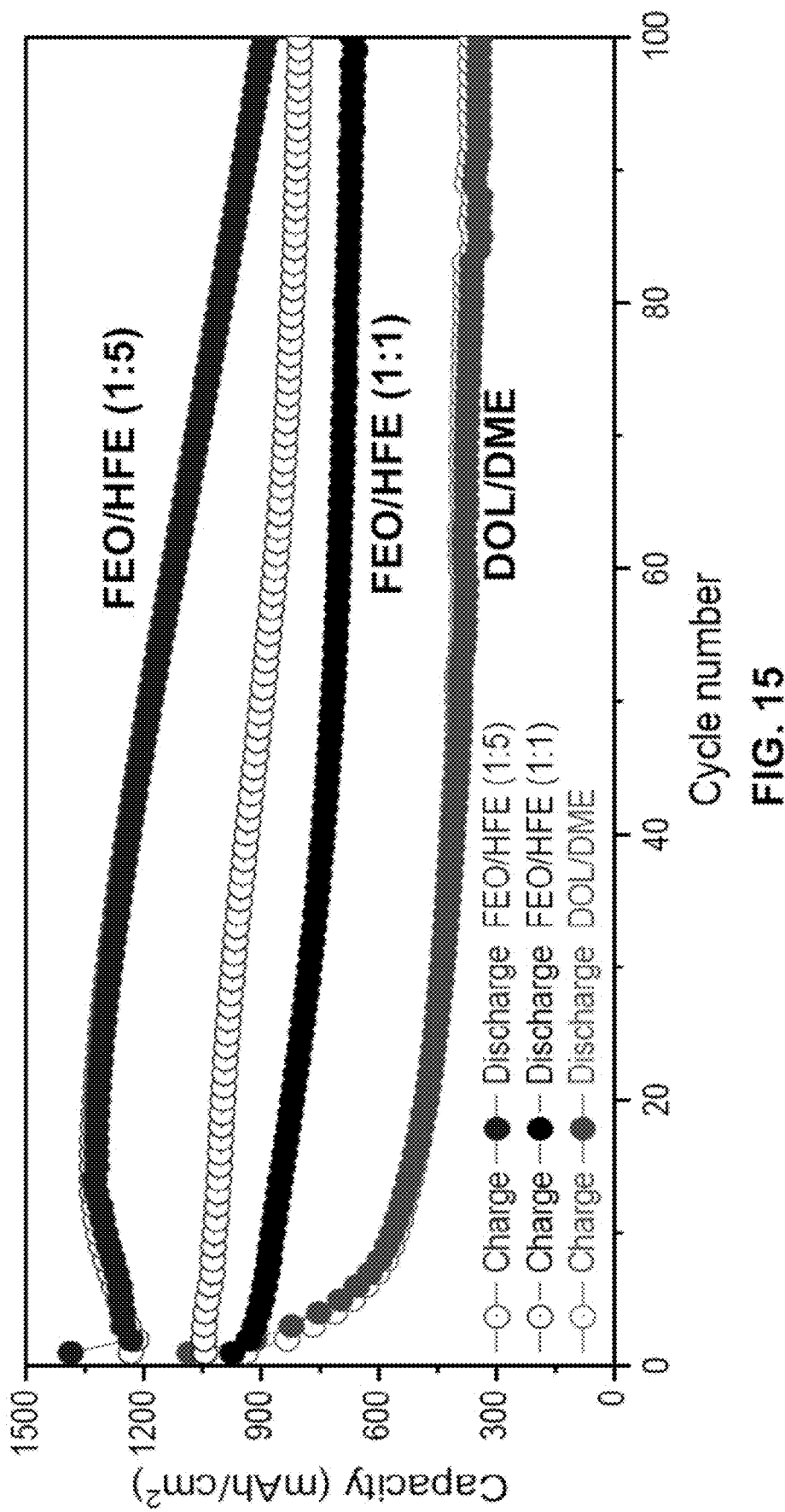
FIG. 15 shows the cell test results for F$_3$EO$_1$:HFE=1:5 (v/v) 0.5 M LiTFSI, wherein HFE is CHF$_2$CF$_2$—O—CH$_2$CF$_2$CHF$_2$.
Figure 16:
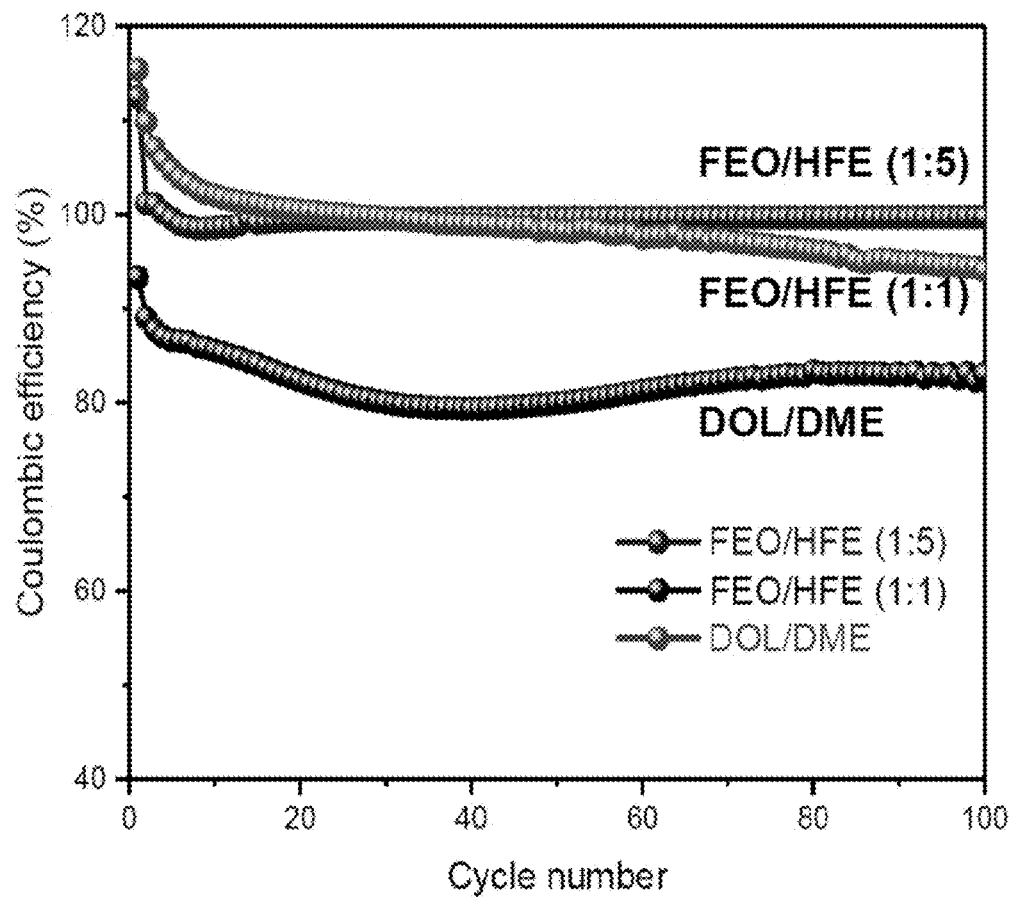
FIG. 16 shows the cell test results for F$_3$EO$_1$:HFE=1:5 and 1:1 (v/v) 0.5 M LiTFSI, wherein HFE is CHF$_2$CF$_2$—O—CH$_2$CF$_2$CHF$_2$.
Figure 17:
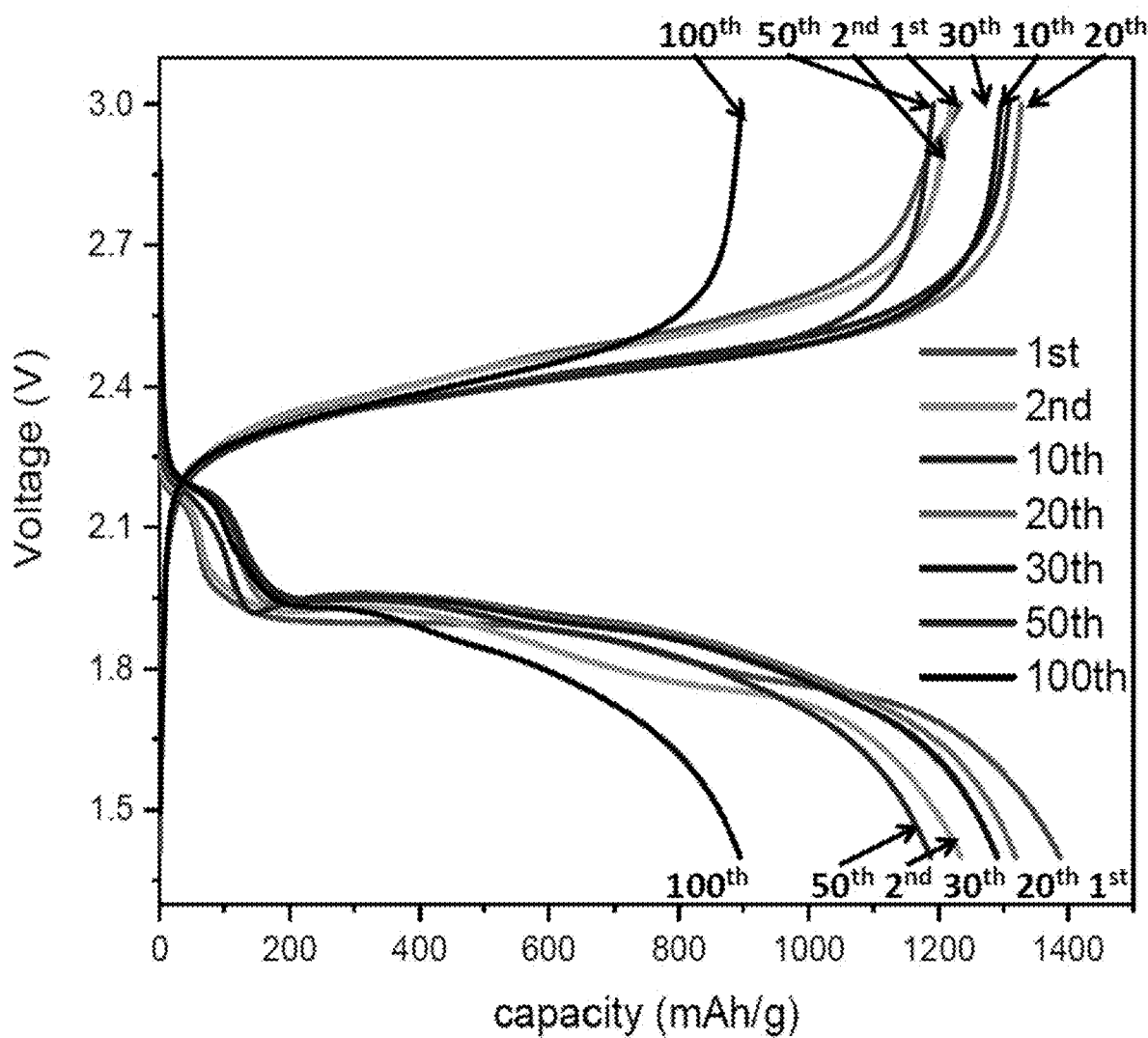
FIG. 17 shows the cell test results for F$_3$EO$_1$:HFE=1:5 (v/v) 0.5 M LiTFSI, wherein HFE is CHF$_2$CF$_2$—O—CH$_2$CF$_2$CHF$_2$.
Figure 18:
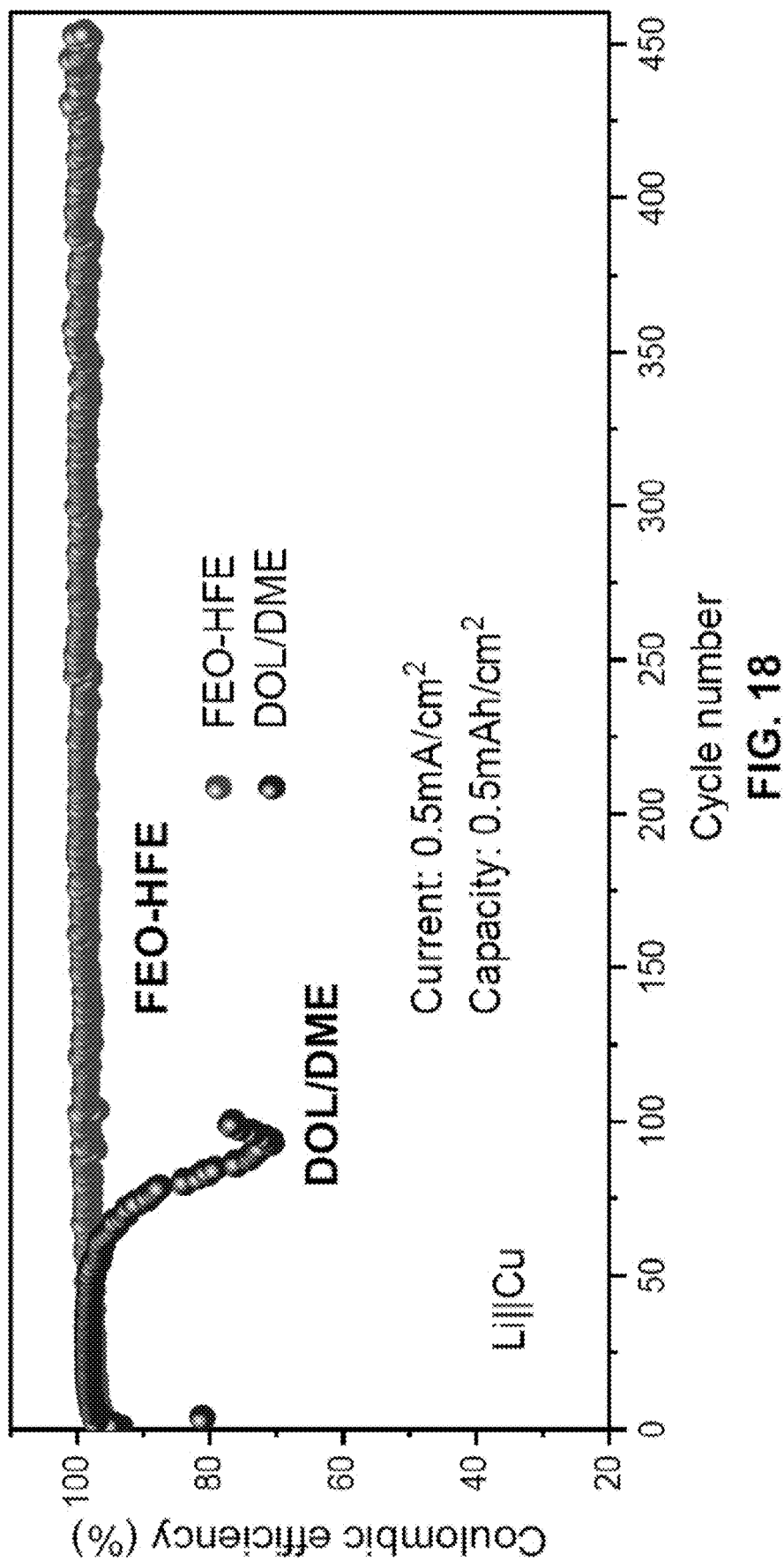
FIG. 18 shows the lithium metal electrode under the F$_3$EO$_1$:HFE=1:5 (v/v) 0.5 M LiFSI electrolyte, wherein HFE is CHF$_2$CF$_2$—O—CH$_2$CF$_2$CHF$_2$. The cell is Li metal against Cu electrode. Operated at above defined current density of 0.5 mA/cm$^2$ for 2 hours for lithium deposition to Cu electrode, and then stripping of lithium metal from Cu electrode at the same current density unit the cell voltage reaches 1 V.
Figure 19:
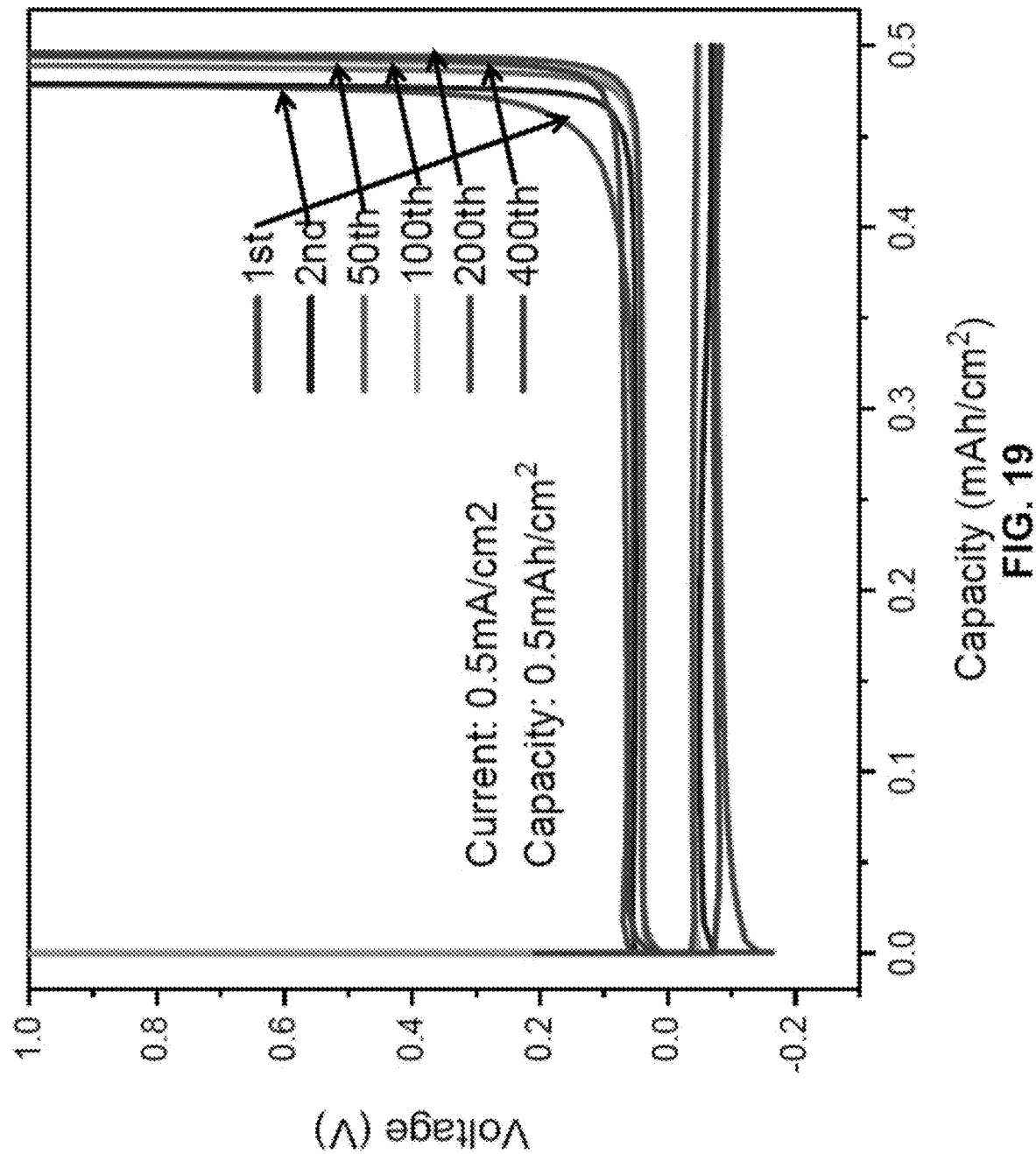
FIG. 19 shows the lithium metal electrode under the $F_3EO_1$:HFE=1:5 (v/v) 0.5 M LiFSI electrolyte, wherein HFE is $CHF_2CF_2$—O—$CH_2CF_2CHF_2$.
Figure 20:
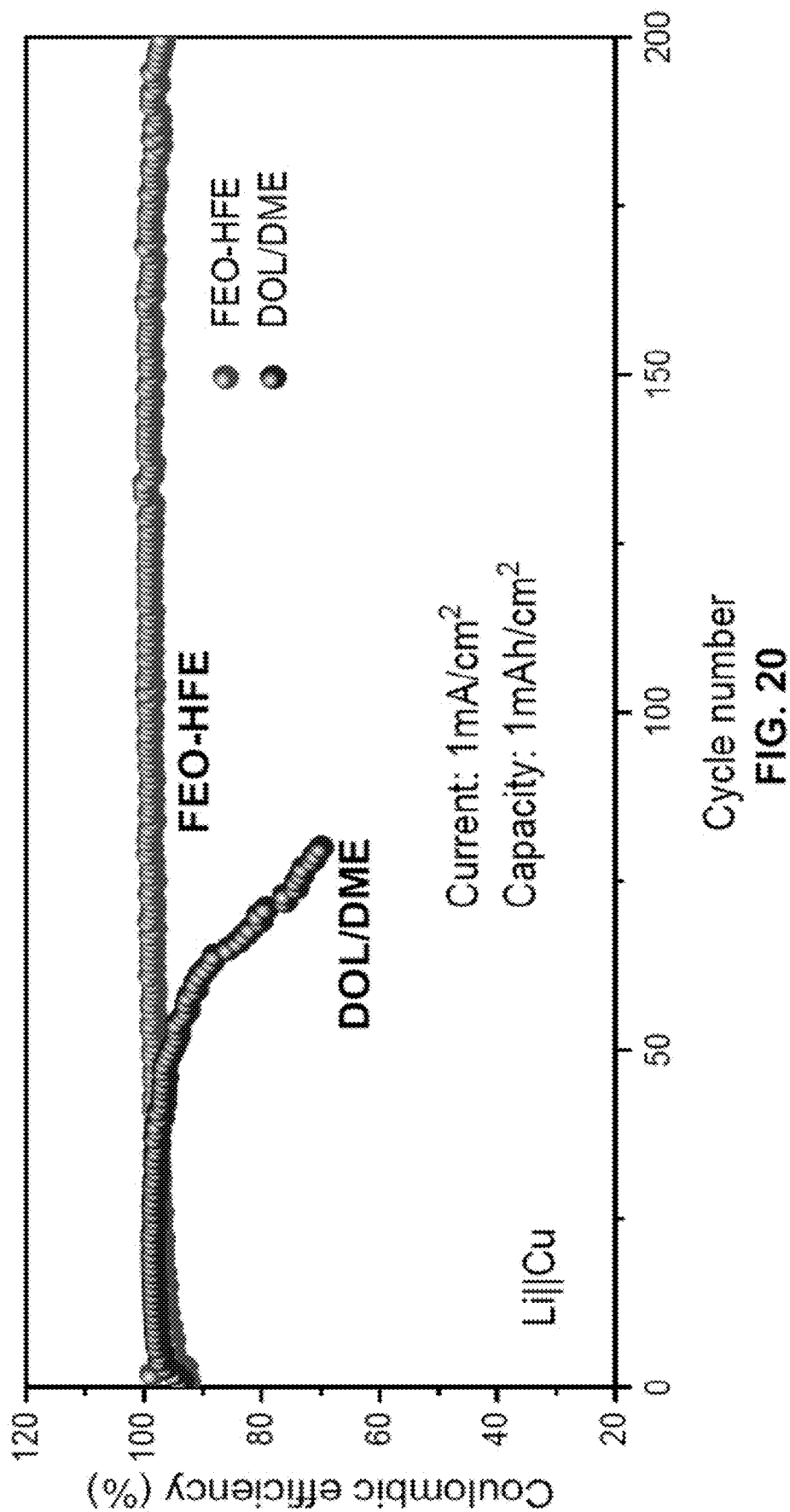
FIG. 20 shows the lithium metal electrode under the $F_3EO_1$:HFE=1:5 (v/v) 0.5 M LiFSI electrolyte, wherein HFE is $CHF_2CF_2$—O—$CH_2CF_2CHF_2$. The cell is Li metal against Cu electrode. Operated at above defined current density of 1 mA/cm$^2$ for 1 hours for lithium deposition to Cu electrode, and then stripping of lithium metal from Cu electrode at the same current density unit the cell voltage reaches 1 V.
Figure 21:
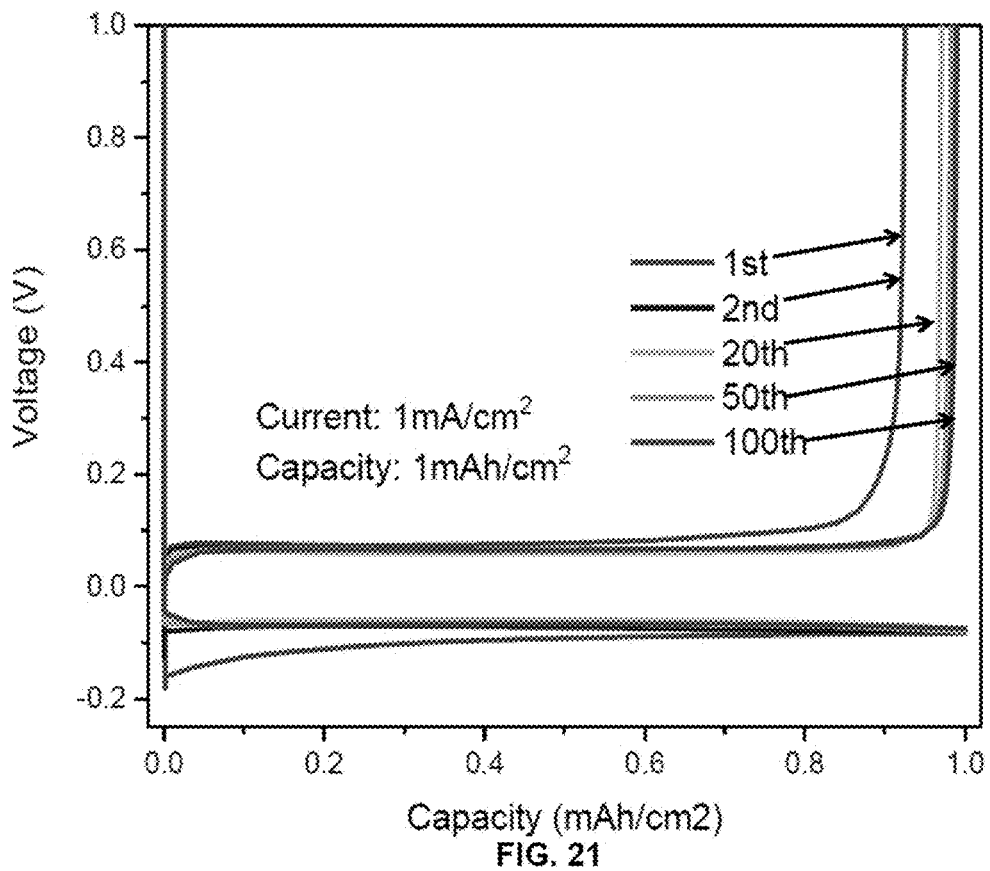
FIG. 21 shows the lithium metal electrode under the $F_3EO_1$:HFE=1:5 (v/v) 0.5 M LiFSI electrolyte, wherein HFE is $CHF_2CF_2$—O—$CH_2CF_2CHF_2$.
Figure 22:
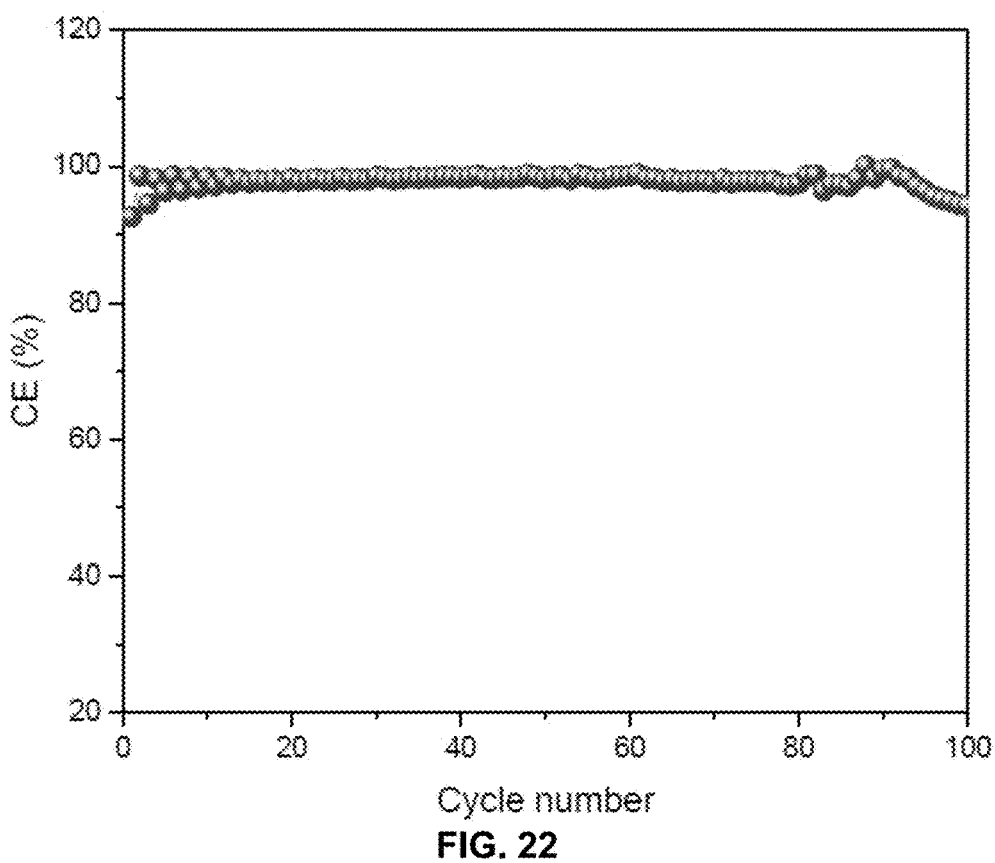
FIG. 22 shows the lithium metal electrode under the $F_3EO_1$:HFE=1:5 (v/v) 0.5 M LiFSI electrolyte, wherein HFE is $CHF_2CF_2$—O—$CH_2CF_2CHF_2$. The cell is Li metal against Cu electrode. Operated at above defined current density of 2 mA/cm$^2$ for 0.5 hours for lithium deposition to Cu electrode, and then stripping of lithium metal from Cu electrode at the same current density unit the cell voltage reaches 1 V.
Figure 23:
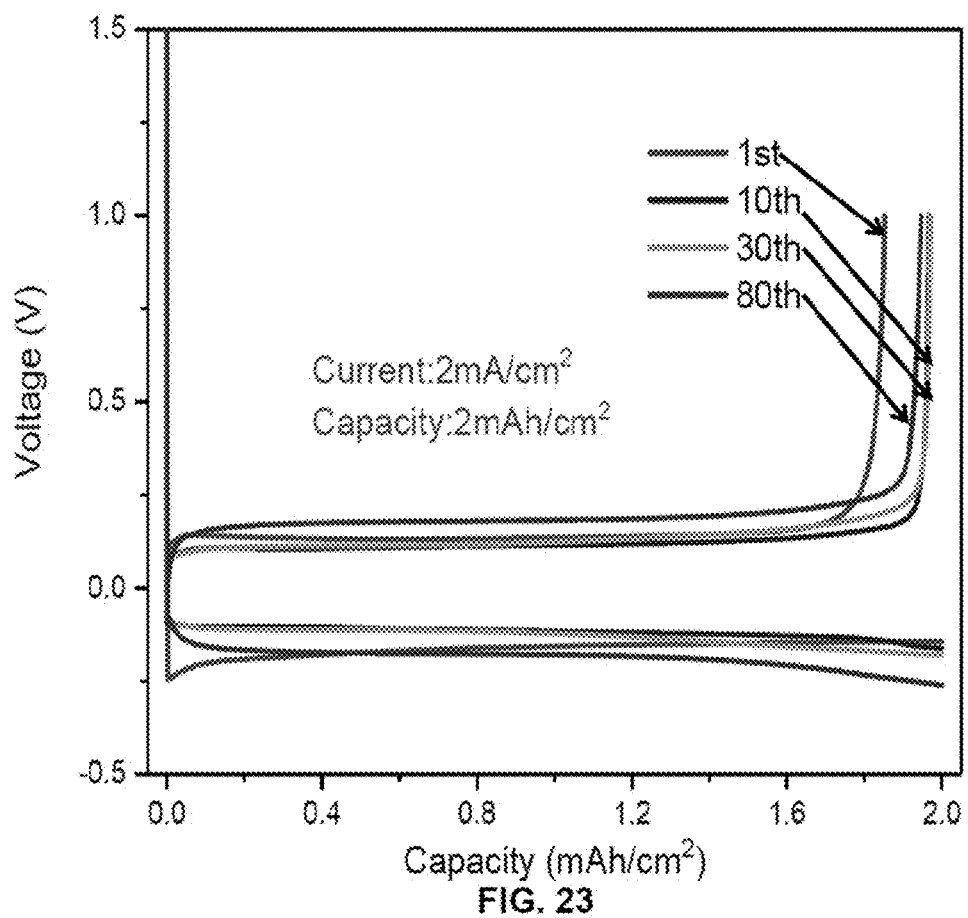
FIG. 23 shows the lithium metal electrode under the $F_3EO_1$:HFE=1:5 (v/v) 0.5 M LiFSI electrolyte, wherein HFE is $CHF_2CF_2$—O—$CH_2CF_2CHF_2$.

FIGS. 15-17 shows the cell test results for $F_3EO_1$:HFE=1:5 and 1:1 (v/v) 0.5 M LiTFSI, wherein HFE is $CHF_2CF_2$—O—$CH_2CF_2CHF_2$.

FIGS. 18-23 shows the lithium metal electrode under the $F_3EO_1$:HFE=1:5 (v/v) 0.5 M LiFSI electrolyte. The cell is Li metal against Cu electrode. Operated at above defined current density of 0.5 mA/cm$^2$ for 0.5, 1, or 2 hours for lithium deposition to Cu electrode, and then stripping of lithium metal from Cu electrode at the same current density unit the cell voltage reaches 1 V.

Figure 24:
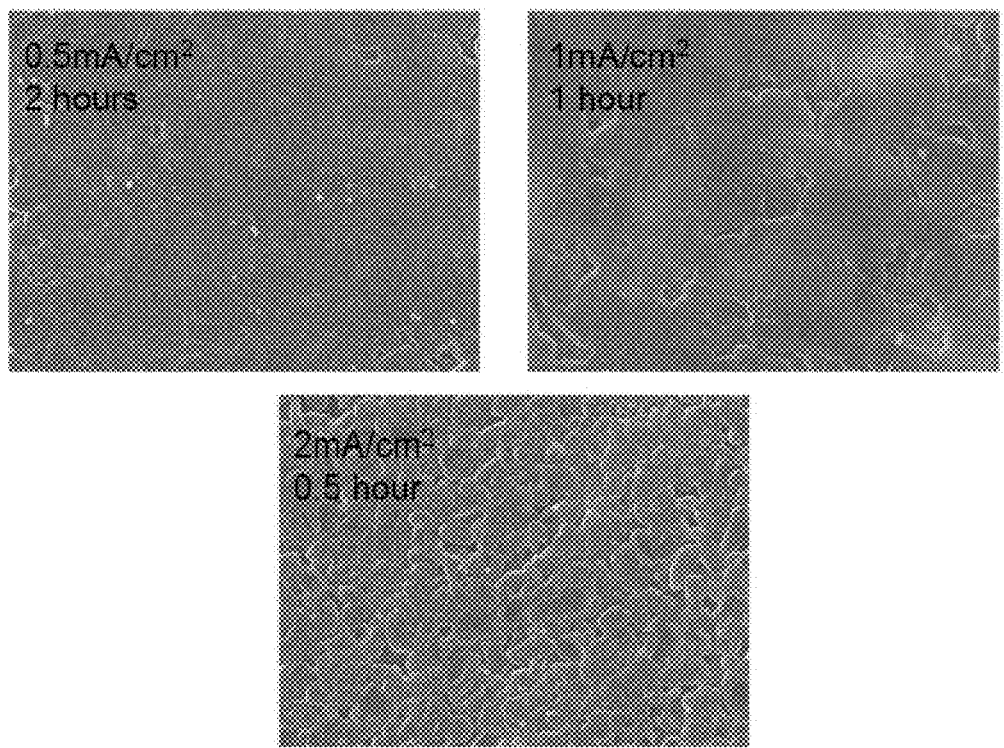
FIG. 24 shows the first cycle lithium metal deposition using the $F_3EO_1$:HFE=1:5 (v/v) 0.5 M LiFSI electrolyte, wherein HFE is $CHF_2CF_2$—O—$CH_2CF_2CHF_2$.
Figure 25:
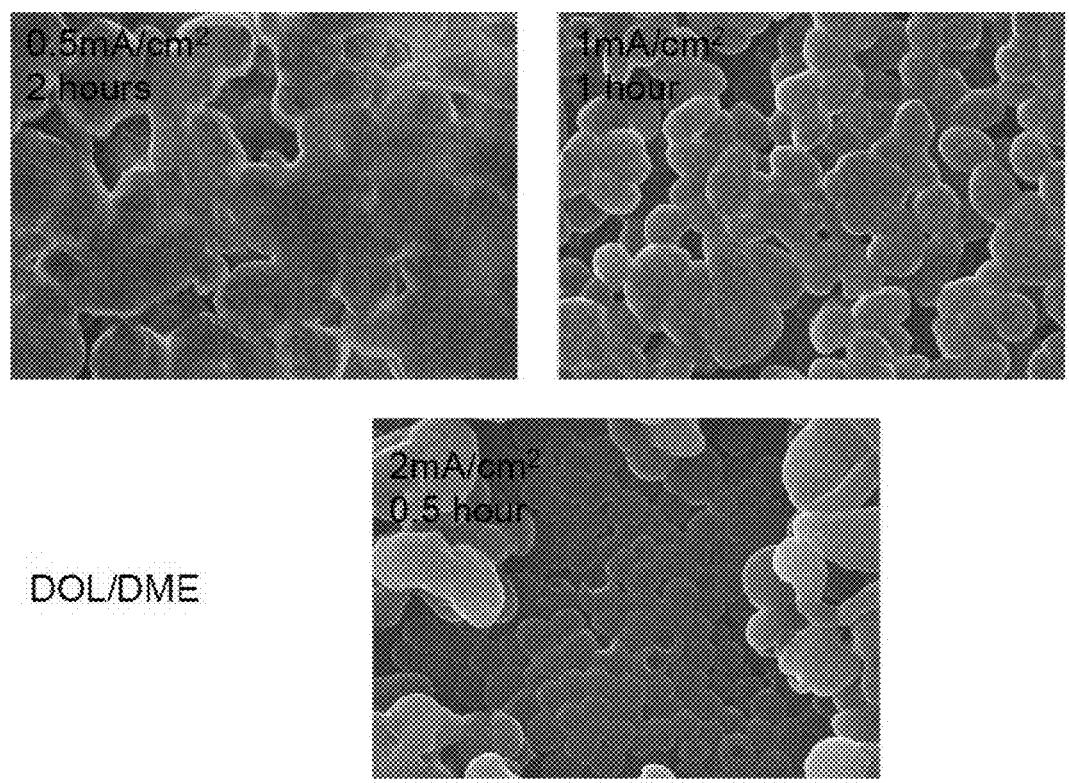
FIG. 25 shows the first cycle lithium metal deposition using the DOL:DME=1:1 (v/v) 1 M LiTFSI electrolyte and 1% $LiNO_3$.

FIGS. 24 and 25 contrast the first cycle lithium metal depositions using the $F_3EO_1$:HFE=1:5 (v/v) 0.5 M LiFSI electrolyte and the DOL:DME=1:1 (v/v) 1 M LiTFSI electrolyte and 1% $LiNO_3$.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

All cited references are hereby each specifically incorporated by reference in their entireties.

What is claimed is:

1. An amphiphilic molecule having the following structure:

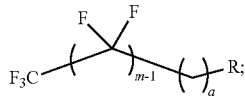
(Chemical Structure I)

wherein R is

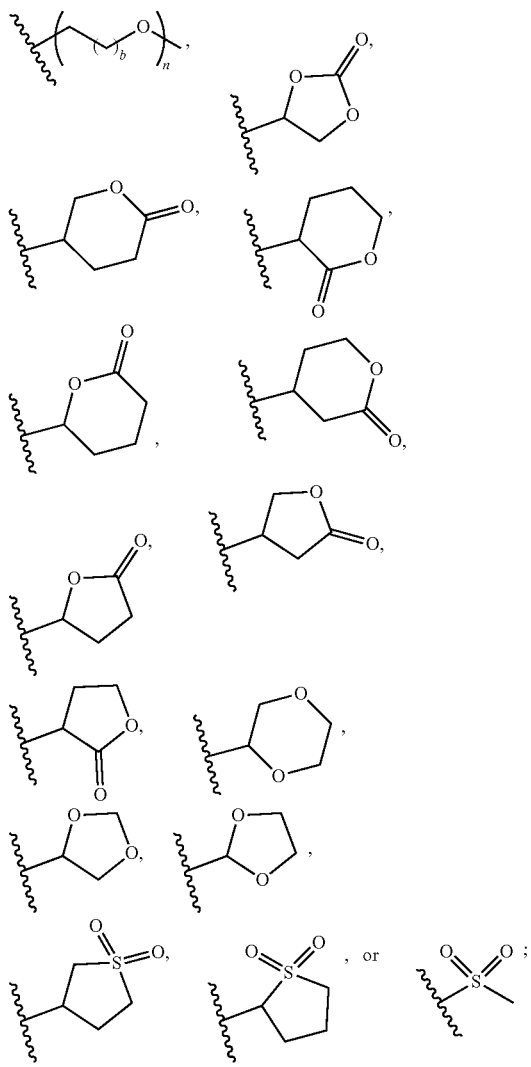

m is an integer from 2 to 21;
a is an integer from 0 to 20; b is an integer from 0 to 4; and
n is an integer from 1 to 20.

2. The amphiphilic molecule of claim 1, wherein m is 2, 3, 4, 5, 6, 7, 8, 9, 10, 11, 12, 13, 14, 15, 16, 17, 18, 19, or 20; a is 1, 2, 3, 4, 5, 6, 7, 8, 9, 10, 11, 12, 13, 14, 15, 16, 17, 18, or 19; b is 0, 1, 2, or 3; and, n is 1, 2, 3, 4, 5, 6, 7, 8, 9, 10, 11, 12, 13, 14, 15, 16, 17, 18, or 19.

3. The amphiphilic molecule of claim 1, wherein the amphiphilic molecule has the following structure:

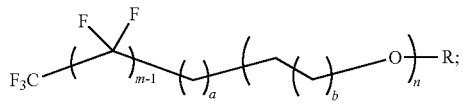
(Chemical Structure II)

wherein m is an integer from 2 to 21, a is an integer from 0 to 20, b is an integer from 0 to 4, and n is an integer from 1 to 20.

4. The amphiphilic molecule of claim 1, wherein R is

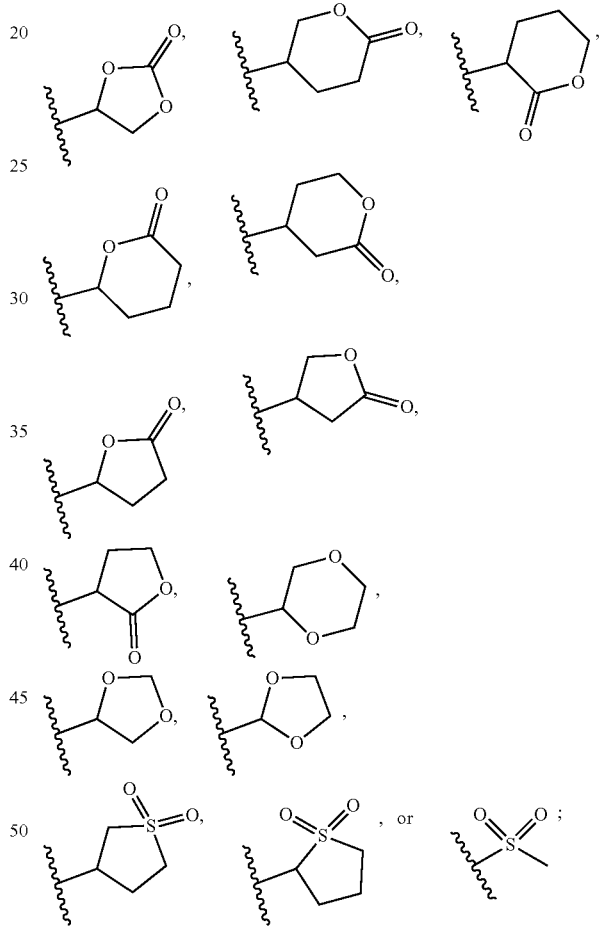

wherein m is an integer from 2 to 21; a is an integer from 1 to 20.

5. The amphiphilic molecule of claim 1, wherein the amphiphilic molecule has the following structure:

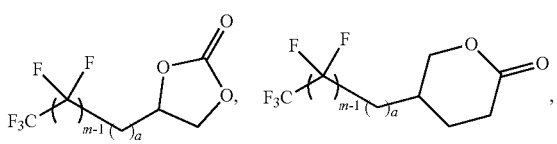

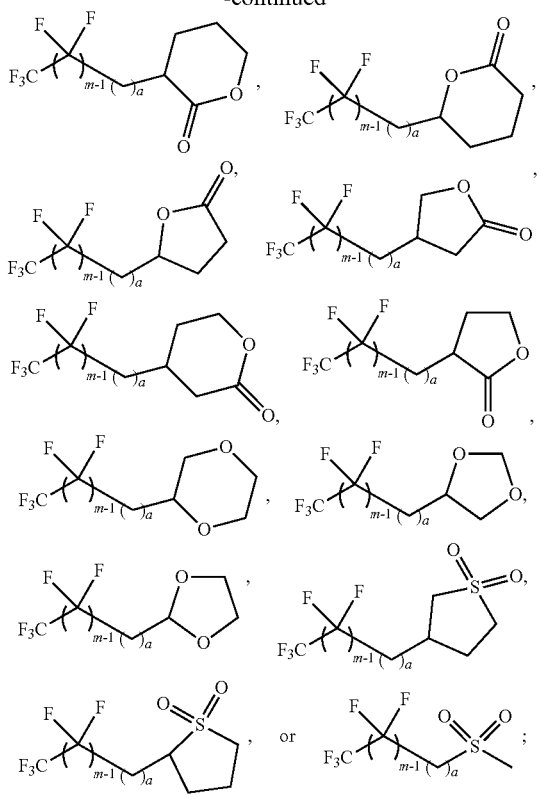

wherein m is an integer from 2 to 21; a is an integer from 1 to 20.

6. The amphiphilic molecule of claim 3, wherein the amphiphilic molecule has the chemical structure of

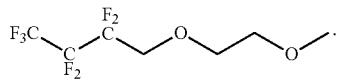

7. The amphiphilic molecule of claim 3, wherein the amphiphilic molecule has the chemical structure of

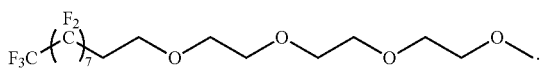

8. The amphiphilic molecule of claim 1, wherein the amphiphilic molecule is capable of self-formation of a micelle.

9. A micelle comprising the amphiphilic molecule of claim 1.

10. The micelle of claim 9, wherein the micelle is an inverse micelle, prolate micelle, inverse prolate micelle, normal hexagonal phase, inverse hexagonal phase inverse, or oblate micelle bilayered fragment.

11. An electrolyte composition comprising an amphiphilic molecule of claim 1, an electrolyte solvent, and a lithium salt.

12. The electrolyte composition of claim 11, wherein the electrolyte solvent is a highly fluorinated alkane, alkyl ether or alkyl tertiary amine comprising more F atoms than H atoms.

13. The electrolyte composition of claim 12, wherein the alkane has a main chain having 2, 3, 4, 5, 6, 7, 8, 9, 10, 11, 12, 13, 14, 15, 16, 17, 18, 19, or 20 carbon atoms.

14. The electrolyte composition of claim 12, wherein the alkane has a straight or branched chain.

15. The electrolyte composition of claim 12, wherein the alkane has a total of 3, 4, 5, 6, 7, 8, 9, 10, 11, 12, 13, 14, 15, 16, 17, 18, 19, or 20 carbon atoms.

16. The electrolyte composition of claim 11, wherein the electrolyte solvent has the following chemical structure: $R_1$—O—$R_2$, or

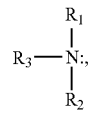

wherein $R_1$ is —$CH_3$, —$C_2H_5$, or —$R_4$; and $R_2$, $R_3$, and $R_4$ are each independently -α-$C_yH_zF_{2y+1-z}$, wherein a is -, —CHF—, —$CF_2$—, or —$CH_2$—; y is 1, 2, 3, 4, 5, 6, 7, 8, 9, or 10; and z is 0 or 1.

17. The electrolyte composition of claim 16, wherein —$C_yF_{y+2}$ is a straight chain alkyl.

18. The electrolyte composition of claim 16, wherein —$C_yF_{2y+1}$ is a branched alkyl, and y is equal to or more than 3.

19. The electrolyte composition of claim 16, wherein $R_1$ and $R_2$ are identical; $R_2$ and $R_3$ are identical; or, $R_1$, $R_2$, and $R_3$ are identical.

20. The electrolyte composition of claim 16, wherein the electrolyte solvent is methoxyperfluorobutane, profluorinated alkane, bis(2,2,2-trifluoroethyl) ether, 1,1,2,2-tetrafluoroethyl-2',2',2'-trifluoroethyl ether, perfluorotributylamine, hydrofluoroether (HFE), or a mixture thereof.

21. The electrolyte composition of claim 20, wherein the profluorinated alkane is $CF_3$ $(CF_2)_xCF_3$, wherein x is 1, 2, 3, 4, 5, 6, 7, 8, 9, 10, 11, 12, 13, 14, 15, 16, 17, 18, 19, or 20.

22. The electrolyte composition of claim 20, wherein the hydrofluoroether (HFE) is $CHF_2CF_2$—O—$CH_2CF_2CHF_2$, $C_7F_{15}$—O—$C_2H_5$, $C_4F_9$—O—$C_2H_5$, n-$C_3F_7$—O—$CH_3$), $CF_3CF_2$—O—$CH_3$, $CF_3CHFCF_2$—O—$CH_3$, $CF_3$—O—$CH_3$, $CHF_2$—O—$CHF_2$, $CF_3CF_2$—O—$CH_3$), or $CF_3$—O—$CHFCF_3$.

23. The electrolyte composition of claim 22, wherein the HFE is $CHF_2CF_2$—O—$CH_2CF_2CHF_2$.

24. The electrolyte composition of claim 11, wherein the lithium salt is lithium bis(trifluoromethanesulfonyl) imide (LiTFSI), lithium bis (oxalato) borate (LiBOB), lithium bis(pentafluoroethanesulfonyl)imide (LiBETI), LiClO₄, lithium bis(fluorosulfonyl)imide (LiFSI), LiPF₆, LiAsF₆, or a mixture thereof.

25. The electrolyte composition of claim 11, wherein the lithium salt has an ionic association strength that is equal to or less than about the ionic association strength of LiBETI, and is equal to or more than about the ionic association strength of LiTFSI.

26. An electrolyte composition comprising one or more amphiphilic molecules of claim 1, or a mixture thereof; methoxyperfluorobutane, profluorinated alkane, bis(2,2,2-trifluoroethyl) ether, 1,1,2,2-tetrafluoroethyl-2',2',2'-trifluoroethyl ether, perfluorotributylamine, or a mixture thereof; and, LiTFSI, LiBOB, LiBETI, LiClO₄, LIFSI, LiPF₆, LiAsF₆, or a mixture thereof.

27. A lithium ion battery comprising the electrolyte composition of claim 11.

\* \* \* \* \*